(12) United States Patent
Schneider et al.

(10) Patent No.: US 7,275,237 B1
(45) Date of Patent: Sep. 25, 2007

(54) REAL-TIME CONTROL SYSTEM DEVELOPMENT TOOL WITH INPUT PINS PROVIDING VALUES USED BY COMPONENT DURING EXECUTION

(75) Inventors: Stanley A. Schneider, Sunnyvale, CA (US); Vincent W. Chen, San Jose, CA (US); Gerardo Pardo-Castellote, Palo Alto, CA (US); Howard H. Wang, Sunnyvale, CA (US); Rajive Joshi, Sunnyvale, CA (US)

(73) Assignee: Real-Time Innovations, Inc., Sunnyvale, CA (US)

( * ) Notice: Subject to any disclaimer, the term of this patent is extended or adjusted under 35 U.S.C. 154(b) by 629 days.

(21) Appl. No.: 10/207,430

(22) Filed: Jul. 29, 2002

Related U.S. Application Data

(62) Division of application No. 09/259,179, filed on Feb. 26, 1999, now Pat. No. 6,718,533.

(51) Int. Cl.
*G06F 9/44* (2006.01)
(52) U.S. Cl. .................. 717/108; 717/105; 715/736
(58) Field of Classification Search ........... 717/108, 717/109, 105; 715/736
See application file for complete search history.

(56) References Cited

U.S. PATENT DOCUMENTS

| | | | |
|---|---|---|---|
| 4,484,294 A | 11/1984 | Noss | |
| 4,568,866 A | 2/1986 | Floro et al. | |
| 4,796,179 A | 1/1989 | Lehman et al. | |
| 5,055,755 A | 10/1991 | Ozawa et al. | |
| 5,086,385 A | 2/1992 | Launey et al. | |
| 5,404,288 A | 4/1995 | McDunn | |
| 5,544,067 A * | 8/1996 | Rostoker et al. | 703/14 |
| 5,546,301 A | 8/1996 | Agrawal et al. | |
| 5,555,201 A * | 9/1996 | Dangelo et al. | 716/1 |
| 5,555,369 A * | 9/1996 | Menendez et al. | 715/762 |
| 5,623,418 A * | 4/1997 | Rostoker et al. | 716/1 |
| 5,715,432 A * | 2/1998 | Xu et al. | 715/764 |
| 5,801,958 A * | 9/1998 | Dangelo et al. | 716/18 |
| 5,838,563 A | 11/1998 | Dove et al. | |
| 5,842,221 A * | 11/1998 | Schmonsees | 707/104.1 |

(Continued)

OTHER PUBLICATIONS

ControlShell verson 5.1 Real Time Innovations Inc, 1996, Whole Manual.*

(Continued)

*Primary Examiner*—Todd Ingberg
(74) *Attorney, Agent, or Firm*—Beyer Weaver LLP

(57) ABSTRACT

A development tool combines advantages of a simulation tool with an object-oriented modeling tool, including a real-time mathematical matrix library and an object model. The tool is applicable to any intelligent control system. A composite object group (COG) contains both sampled-data and event-driven capabilities. COGs merge procedural and object-oriented programming, and provide explicit, graphical integration of both types of processing and are fully hierarchical. A control system is built up of object-oriented components, including these types: atomic, interface, data flow and state transition. A finite state machine (FSM) component is built from states, transitions, events and state transition components. Data flow components provide sampled-data capabilities. FSMs provide event-drive capabilities. Each component may include methods and attributes. A COG includes any type of component including COGs, graphical interconnections between components, and is used to graphically build a model of a control system.

8 Claims, 24 Drawing Sheets

U.S. PATENT DOCUMENTS

| | | | |
|---|---|---|---|
| 5,867,399 A * | 2/1999 | Rostoker et al. | 716/18 |
| 5,892,510 A * | 4/1999 | Lau et al. | 715/866 |
| 5,971,581 A | 10/1999 | Gretta et al. | |
| 6,026,352 A | 2/2000 | Burnes et al. | |
| 6,075,935 A * | 6/2000 | Ussery et al. | 716/17 |
| 6,076,952 A | 6/2000 | Gretta et al. | |
| 6,112,015 A * | 8/2000 | Planas et al. | 709/223 |
| 6,154,680 A | 11/2000 | White et al. | |
| 6,195,591 B1 | 2/2001 | Nixon et al. | |
| 6,222,537 B1 * | 4/2001 | Smith et al. | 715/762 |
| 6,259,958 B1 | 7/2001 | Steinman et al. | |
| 6,353,446 B1 * | 3/2002 | Vaughn et al. | 715/733 |
| 6,381,644 B2 * | 4/2002 | Munguia et al. | 709/225 |
| 6,470,482 B1 * | 10/2002 | Rostoker et al. | 716/6 |
| 6,473,797 B1 * | 10/2002 | Hirasawa | 709/224 |
| 6,484,304 B1 * | 11/2002 | Ussery et al. | 716/18 |
| 6,513,047 B1 * | 1/2003 | Talley | 707/200 |
| 6,691,301 B2 * | 2/2004 | Bowen | 717/114 |
| 6,718,533 B1 * | 4/2004 | Schneider et al. | 717/100 |
| 6,865,429 B1 * | 3/2005 | Schneider et al. | 700/86 |
| 7,024,627 B2 * | 4/2006 | Kumar et al. | 715/733 |
| 7,080,365 B2 * | 7/2006 | Broughton et al. | 717/146 |
| 7,103,873 B2 * | 9/2006 | Tanner et al. | 717/109 |

OTHER PUBLICATIONS

Opn Look, Sun Microsystems, Inc, TOC, 1989.*

Object-Oriented Interface Design, Que, IBM, 1992, pp. 1-92, 99-164.*

M. M. Burnett et al., "Visual Object-Oriented Programming Concepts and Environments", published 1994, pp. 1-274.

Taylor, "Object-Oriented Information Systems Planning and Implementation", (Apr. 1992) pp. 1-172, 215-282.

Rational Rose Using Rational Rose 4.0 Rational Software Corporation, (Nov. 1996) pp. 1-219.

Quatrani, "Visual Modeling with Rational Rose and UML", 3rd printing (Apr. 1998) pp. 1-222.

Unified Modeling Language UML BOOCH & OMT Quick Reference for Rational Rose 4.0 (Nov. 1996).

Firesmith, "Dictionary of Object Oriented Technology" (1995) p. 85.

* cited by examiner

```
On Execute Method
Begin
    Call DoSetGoal X (new)
End
```

```
Set Goal Method
Begin
    Call ComputeTrajectory X (new)
End
```

Interface Component

Composite Object Group

150

170

```
Methods
    provides    Set Goal (X)
    uses        Done ( )

Pins
    output      X (desired)
```

Trajectory Generator Interface

```
Methods

Pins
    input       X (desired)
                X (actual)
    reference   Gain
    output      control
```

PD Controller Interface

```
Methods
    provides    Pick Up (Item)
    uses        doLook
Pins
    input       X (actual)
    reference   Gain
    output      control
```

Intelligent Control COG Interface

REAL-TIME CONTROL SYSTEM DEVELOPMENT TOOL WITH INPUT PINS PROVIDING VALUES USED BY COMPONENT DURING EXECUTION

This application is a divisional of U.S. patent application Ser. No. 09/259,179, filed Feb. 26, 1999 now U.S. Pat. No. 6,718,533 entitled "Real-time Control System Development Tool," which is hereby incorporated by reference.

This application is related to U.S. patent application Ser. No. 10/207,603, filed on the same date herewith, having the same title, which is hereby incorporated by reference.

This invention was partially funded under National Institute of Standards and Technology (NIST) Advanced Technology Program (ATP) contract No. 70NANB5H1163. The government has certain rights in this invention.

FIELD OF THE INVENTION

The present invention relates generally to a programming tool for software development. More specifically, the present invention relates to a tool for developing and executing real-time control systems.

BACKGROUND OF THE INVENTION

Real-time system software is notoriously complex. Large projects must balance the special needs of real-time software—such as event processing, data sampling, and feedback control—with the needs of interacting teams of programmers, engineers, managers, and maintenance personnel. Successful projects require solid software architecture, an intuitive, graphical programming paradigm, and a well-developed reuse capability.

Building software for real-time control systems is a huge challenge. The software must coordinate actuators, sensors, and interactions with the real world. It must deal with complex and intelligent subsystems. Many systems are large applications developed by teams of programmers, engineers, architects, and managers. All team members must be able to both understand and contribute to the design. The demands for a modular, clean design are compounded by the special needs of control systems such as control and sequencing. Systems are built, simulated and tested incrementally for best results. Significant legacy code embodying years of experience is often required to be used. In the past, these control systems defied reorganization. Prior art development tools for such complex systems have simply not been able to keep pace with the demands of these complex systems.

Development tools built for other real-time applications—such as telecommunications or databases—are not well suited to the challenges of complex control systems. In particular, they are not well-suited for complex electromechanical systems. Generic programming languages and methodologies are useful for modeling. They carefully define the nuances of syntax and meta language. But often they do not truly accelerate development. In particular, prior art object-oriented modeling tools are useful for some systems as will be described below, but are not well suited for the needs of complex, real-time control systems.

Prior art mathematical simulation tools can also be useful. They allow you to build and test dynamic models of the physical processes in your system. However, in most systems they only apply to a small percentage of the total problem. They are not good programming systems, and thus cannot handle truly complex systems that require significant custom coding. In particular, mathematical simulation tools are useful for certain applications as will be described below, but are also not especially well-suited for the needs of complex, real-time control systems.

In general, two approaches have been used in the prior art to develop complex software systems: top-down design and bottom-up design. Top-down design means breaking the problem into smaller and smaller parts until the pieces can be implemented easily. Top-down design is very general and powerful; it can eventually solve most problems. It is also intuitive, it allows division of labor, and it encourages rapid prototyping through consideration of intermediate incomplete models of a complex system. It provides a high level view important to communication and understanding between team members and management.

Most people naturally think of complex systems in a top-down, object-oriented fashion. For instance, when you describe a car, you think of the engine, the frame, the transmission, and other systems as functional, complete objects that cooperate to make the whole complex system. However, the top-down design process has a serious flaw: it leads to unique solutions to every problem. Each top-down design subdivides the problem in a unique way. None of the resulting subsystems can be reused easily. A top-down design has been called "the process of making all your worst mistakes first." A top-down designer building a car would start with a concept drawing, and break it into subsystems as best fit the problem. However, like a concept car, the result will contain many strange parts that all have to be painstakingly handcrafted.

Often, prior art object-oriented modeling tools are thought of as providing a top-down design approach because they provide an object model view of the world. In particular, various prior art object modeling tools work well for general problem areas, but are not optimal for complex, real-time control systems. For example, one object modeling tool available from Rational Corporation of Sunnyvale, Calif. is called "Rose." Rose is based on the well-known Unified Language Modeling (UML) graphical development tool (a general tool). Rose provides event-driven processing for general problem areas. Another UML-based tool is "Rhapsody," available from iLogix Corporation of Andover, Mass. that also addresses general problem areas. Another representative object modeling tool is "ObjecTime," available from ObjectTime of Ottawa, Canada. ObjecTime is based on the real-time object-oriented modeling (ROOM) language and is especially suited for modeling telecommunications systems.

In general, these prior art object modeling tools are based primarily on event-driven processing because of the problems to which they are addressed. They are not well-suited for, and are unable to handle, sampled-data processing mainly because the problems they address do not require it. In general, these prior art object modeling tools do not provide sampled-data processing that is often critical in complex real-time systems. Specifically, these tools have no concept of matrices and are unable to implement detailed mathematical calculations nor evolve over time. These deficiencies mean that these tools may not be well-suited for certain real-time systems that require such complex mathematical simulations.

At the other end of the spectrum are bottom-up design tools. Bottom-up design is the process of synthesizing from preexisting components. A bottom-up design process for building a car would be to walk into an auto parts store and begin piecing together the vehicle from parts on the rack. Bottom-up design is great for reusing such parts. However, without the overall picture and goal in mind, it often does not result in a clean division of functionality. The bottom-up design process provides no overall view to communicate the goals and progress of a project between team members. Bottom-up design is important for reuse, however, and to achieve true leverage, software must be reused unmodified. By contrast, copying and modifying code creates many source versions that must be independently tested and maintained. Only true reuse generates the leverage that results in large dividends.

To be truly powerful, bottom-up design should support multiple levels of granularity. Small, functional components are easy to reuse, but do not provide large benefits. On the other hand, large-scale components provide large-scale benefits. The reuse of an entire subsystem as a component would accelerate greatly the next system's implementation. But complex components have complex interfaces and specific functions. The more complex the component, the harder it is to reuse. Clearly, to maximize the benefits of component-based design, components should be reusable at different levels.

Many of the prior art mathematical simulation tools often are thought of as providing a bottom-up design. As such, they provide advantages for certain narrow problem areas, but are not well-suited for modeling complex real-time systems. One simulation tool is "Simulink," available from Math Works of Natick, Mass. Another simulation tool is "System Build," available from Integrated Systems, Inc. of Sunnyvale, Calif. These prior art simulation tools (and others) are based upon a mathematical model of the world and use complex matrix libraries to simulate a model using matrices. These tools are useful for simulating complex processes over time where complex calculations are involved. These tools typically provide sampled-data processing that can simulate a system and evolve over time.

These simulation tools, however, are not object-oriented programming tools and are not well-suited for modeling systems or for building complex real-time systems. Specifically, these tools are useful for building a data flow model of the world where intense number crunching is necessary, but they do not provide objects, methods upon objects, or the other beneficial features of object-oriented programming tools.

Unfortunately, often complex problems require both a top-down and a bottom-up approach. The two approaches are very different and require fundamentally different thought processes. Complex, real-time systems (and electromechanical systems in particular) may have a need for both data-flow processing as well as specific reactions to discrete events.

Therefore, a method and apparatus are desired that would provide the advantages of both top-down and bottom-up design for real-time control systems. Further, a method and apparatus are desired that would provide the object-oriented and event-driven capabilities of object-oriented modeling tools with the matrix manipulation and sampled-data processing features of mathematical simulation tools.

Another area of intelligent control that could benefit from improvement is the management of modes. Most complex systems require different operating modes. To illustrate, consider the simple example of a hybrid automobile powered by both gasoline and electricity. The car has both batteries and gasoline for use as fuel, and both an electric motor and a gasoline engine for propulsion. The car can be operated in two modes. In the zero-emission mode, the car uses the electric motor and the batteries. In the low-emission mode, the car uses the gasoline engine and the gasoline. Of course, real-life control systems are incredibly more complex.

Some prior art systems attempt to implement modes informally using ad-hoc implementation of "if-then-else" statements. This technique is confusing and hard to understand and maintain. Other systems use special "switch blocks" that run control lines to every other block within the system. These lines can become very complex and difficult to manage, let alone simply trying to figure out which mode the system is in. Furthermore, many complex systems often radically change modes of operation during execution. The designs of these systems may fail to consider the wide-ranging effects of these mode changes and "run out of steam" due to the complexity of the branches and switch blocks required. A fundamentally new approach to the management of modes would be desirable.

Another area of intelligent control that could benefit from improvement is the creation of executable programs for different purposes. Often a user will create a complex control system and its corresponding executable image to run on a specific real-time computer. The user, however, may wish to simulate the system on his or her own desktop computer. It can be time-consuming and complex to redo the system to make a simulation. Certain components only applicable to the real-time computer might have to be removed and substituted with simulation components.

Another area of intelligent control that could benefit from improvement is the optimal utilization of processing resources. Often different elements within a control system might need to run at different rates. The fast rate required for a particular sensor may be incompatible with the slower sampling rate of a different element. Simply slowing the whole system down to accommodate one slow rate element is not efficient. Conversely, speeding up the whole system to run at a fast rate is not feasible if one particular sensor or data sampling element cannot cycle that quickly. Further, it can be unwieldy to break the system into different pieces for different processors, only to try to cobble the system back together to make it function correctly. It would be desirable to take advantage of numerous processors and/or multiple threads of execution that may be provided by a real-time computer.

SUMMARY OF THE INVENTION

To achieve the foregoing, and in accordance with the purpose of the present invention, a development tool is disclosed that combines the advantages of a simulation tool with an object-oriented modeling tool. An embodiment of the present invention is based on a real-time mathematical matrix library, but also has an object model. Advantageously, most all real-time systems can be modeled using the present invention. The present invention supports the entire process for building complex real-time systems: design; development; execution; test; and maintenance. The present invention is well-suited for systems that have complex interactions, require strategic decisions, use control, have intelligent subsystems, and/or exhibit modal behavior.

In general, the present invention is applicable to any intelligent control system. In particular, the present invention is advantageous for developing software for real-time electromechanical systems. For example, the present invention is applicable to aerospace systems, robotics, autonomous vehicles, hardware-in-the-loop (HIL) test, semiconductor manufacturing equipment, and many other types of complex electromechanical systems. Nevertheless, the present invention is not to be limited to electromechanical systems, but can also be used for signal processing, process control, medical imaging, radar control, etc.

Advantageously, the present invention realizes that many real-time systems (and electromechanical systems in particular) have two very different aspects: continuous data flow and event-driven reaction. These two aspects are common to most complex systems, and in particular are fundamental in electromechanical systems. It is observed that in complex electromechanical applications, sampled-data processing and event-driven processing are tightly integrated. In fact, most real-time applications can be divided into recognizable subsystems that include both sampled-data and event-driven processing. For instance, a robotic system has subsystems for the arm, gripper, and vision. Each processes data continuously (i.e., cyclically samples data) but also executes sequences when events are detected.

One embodiment of the invention codifies this observed structure. The present invention introduces the concept of a composite object group, or "COG". A COG is an object that may contain both sampled-data and event-driven capabilities. COGs are extremely powerful in that they are intuitive, they merge procedural and object-oriented programming, and are they well-suited for implementing intelligent control systems. A COG provides explicit, graphical integration of both types of processing and are fully hierarchical. That is, you can design complex systems by building COGs made up of other COGs. A COG may also contain a third aspect, an interface. An interface specifies both the data flow through the COG and the set of methods the COG provides (implements) and uses.

In addition to combining event-driven and sampled-data processing, COGs are also able to bridge procedural and object-oriented design. Both event-driven and continuous data applications are most naturally thought of as occurring procedurally. Control engineers are used to thinking in this manner; control systems are built from blocks that process inputs and produce outputs. On the other hand, larger subsystems are most often best modeled as objects. Objects are usually thought of as executing independently of and concurrently with other objects. They communicate by exchanging asynchronous messages. Object-oriented design is fundamentally different than procedural thinking. As a COG is an object that is built from procedural components, it neatly bridges the gap between procedural thinking (more efficient at low engineering levels) and powerful object-oriented thinking (more efficient at higher system design levels).

Prior art modeling languages, such as C++ and UML, provide a means of describing arbitrary relationships between various objects for attacking general problem domains. Each object can contain arbitrary functionality. UML, for example, is an object-oriented graphical notation that is a very general modeling language. It is used for everything from airline reservation transaction systems to cellular telephone firmware. UML's first primary function is analysis—the process of examining a problem and designing a structure that can solve the problem. This is a top-down approach. Each problem leads to a unique structure.

By contrast, the present invention uses COGs to model complex real-time systems, and in particular is well-suited for modeling electromechanical systems. This utilization of a specific object model bestows many benefits. For instance, it shortcuts much of the tedious analysis and object hierarchy design phase. The present invention provides specific data structures and reusable objects that fit specific problem domains. It allows problems to be modeled faster and complex code to be working more quickly. In addition, the present invention is not limited to providing only a top-down design approach as in UML.

Recognizing the tradeoff between top-down and bottom-up design, the present invention takes a unique merged approach. Top-down object decomposition is combined with bottom-up component-based synthesis from reusable software. This combined approach couples object-oriented design with the power of building systems from tested, preexisting software components. It uses an intuitive approach to developing systems that match how most engineers naturally design. Initially, a global, undefined concept is decomposed into more specialized subsystems (or modules). Along the way, reusable objects are defined and incorporated that ensure clean divisions between subsystems. Finally, subsystems are built from the bottom-up by graphically combining components from a repository of reusable software. This merged approach combines the power of object modeling with the leverage of component-based synthesis.

This top-down/bottom-up combined approach is very intuitive. It allows designers to work simultaneously at different levels of abstraction-today on the overall design, tomorrow on a specific subsystem. This makes it easy to iterate between partially-specified designs and fully-specified subsystems. In one aspect of the invention, interfaces are defined between subsystems during top-down decomposition. As long as the interfaces are unique, top-down decomposition continues. When the design is refined to the point that existing components can be used, these components are then used to fill in the functionality needed. Thus, design may begin from the top-down, but eventually commonly defined components are reached during the process. Prior art tools have provided no mechanism for this combined design to occur.

The present invention also provides a technique by which a commonly used object interface may be defined as a reusable object. Thus, a mechanism for both defining and reusing interfaces is provided, making standardized interfaces are possible. Over time within a project, an organization, or even a market, these interfaces allow component-based design. Because these interfaces can be attached to many different software objects, they provide a layer of abstraction between the external behavior of an object and its implementation.

The present invention also provides a technique for "mapping" the computing resources of a computing device throughout the hierarchy of a control system. Mapping is provided for modes, executable programs and threads of a processor.

Under mode mapping, the user is allowed to choose in a simple and intuitive manner which components of the control system will run in which mode. Each component may have a number of modes, each identified by a name. For a group of components (e.g. a control system for a robot arm), a mode may be defined for this whole group by picking and choosing desirable modes for the components contained within. Thus, for a given mode for the whole system, only selected components are "active" and will run. This allows a user to choose at high level which code will be allowed to run for a given situation.

Using executable mapping, the user chooses on which processor components will run. Users may build multiple executable programs from a single system diagram. Multiple executables are desirable should the user wish to create one executable for the actual hardware real-time computer, and another executable for simulation on the user's own computer. With executable mapping, the user can create an executable for each situation by choosing which components are to be run in which situation. In other words, an individual processor can be chosen on which to run each component simply by naming an executable for each component.

Within a given processor, each component of a control system may be assigned to individual execution threads within that processor simply by naming a thread. Each thread may be configured to execute at a different rate, thus providing different rates of executions for different components within one control system. Also a composite component such as a composite object group or a finite state machine may be assigned to multiple threads to accommodate the different needs of its constituent components. Each component in the hierarchy of a system diagram is assigned a logical rate that is eventually mapped to an actual rate of a thread. In this way, a component with its hierarchy of logical rates is reusable and may be inserted into a different real-time system that might have different threads and rates available. When used in this way, the logical rates of a component are simply mapped to whatever actual rates that are available (which may number greater or fewer than the logical rates); each lower-level component is thus assigned to an actual rate.

Thus, mechanisms for specifying and changing the modes of operation of a control system are provided, for assigning portions of the system to be embodied into different executable images, and for assigning portions of an executable image to be executed by different operating system threads of a processor. These mechanisms provide a named layer of abstraction between hierarchical levels, and thus allow each hierarchical level to be more self-contained. Prior art systems instead utilize "if" statements or control lines and switch blocks, and are thus more poorly structured. These three types of mapping, modes, executables and threads, may exist independently of one another, or may be combined with one another in a single control system.

BRIEF DESCRIPTION OF THE DRAWINGS

The invention may best be understood by reference to the following description taken in conjunction with the accompanying drawings in which.

DETAILED DESCRIPTION OF THE INVENTION

Real-time software for control systems is complex. There are excellent control and simulation tools, but often they do not address the complex programming needs of many systems. There are general programming tools, but often they do not provide useful facilities for real-time control problems. What is missing is a programming tool with prebuilt architectures designed specifically for real-time control problems. Although the present invention is suitable for use with a wide range of intelligent control applications, real-time electromechanical systems in particular will often be highlighted in the course of this disclosure to provide a working example.

Control systems may be complex because of the mathematical algorithms they contain, or because they contain many concurrent elements. For example, electromechanical systems exhibit both of these types of complexity to some extent, but more importantly are faced with computational structure complexity. Electromechanical systems must make strategic decisions, communicate with complex intelligent modules and user interfaces, process data, execute feedback loops, change modes, and drive complex hardware. Interconnecting these subsystems leads to even more structural complexity. Many systems must also be modal, changing behavior in response to changes in operating conditions. Modal behavior can add very significant—and often unforeseen—structural complexity. Structural complexity dominates most electromechanical systems.

Because it is difficult to handle all types of complexity, programming languages often make choices based on their target systems. The development tool of the present invention provides facilities to address structural complexity and also recognizes the duality of sampled-data and event-driven processing. The resulting tool is simple, powerful and maps directly to intelligent control problems.

Overview and High Level Diagram

Figure 1:
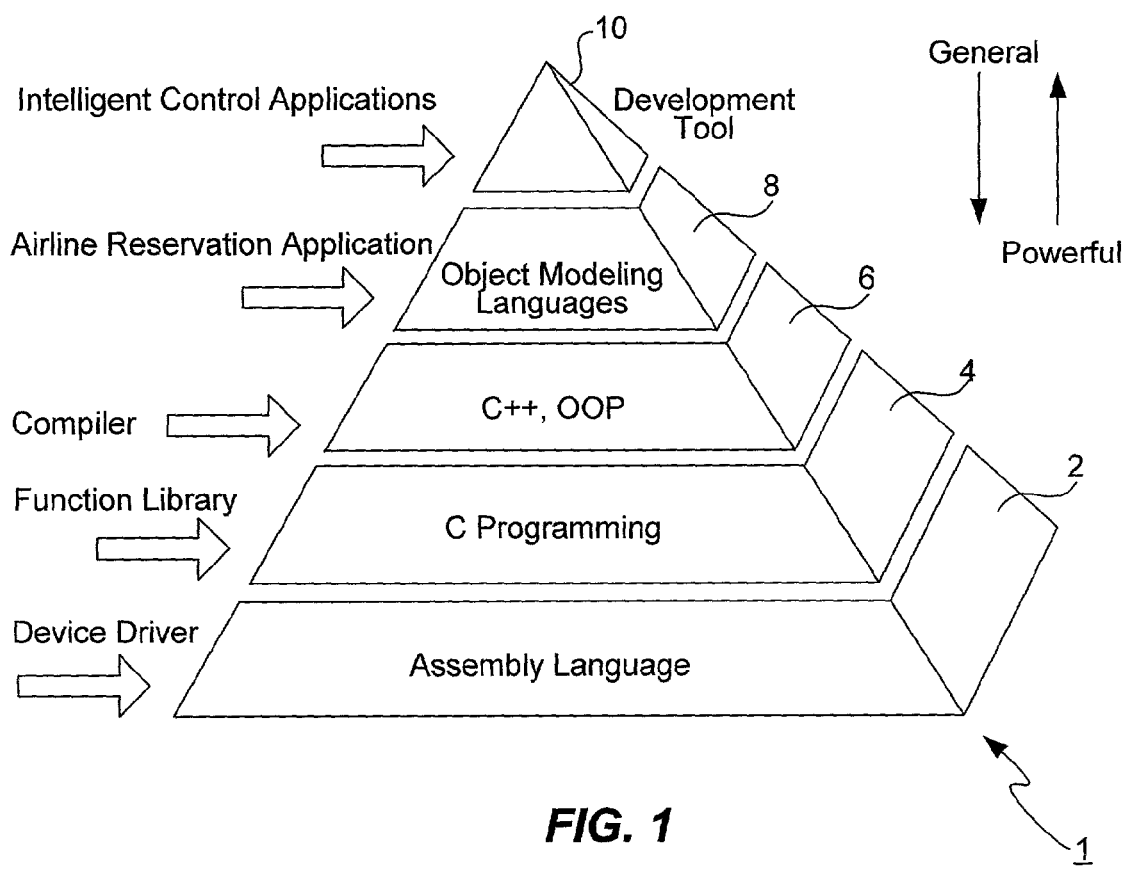
FIG. 1 is a pyramid symbolizing the power versus generality tradeoff in programming languages.

FIG. 1 is a pyramid 1 symbolizing the power versus generality tradeoff in programming languages. There is a tradeoff between power and generality in any implementation technique. Theoretically, each application problem should use the least general—and therefore the most powerful programming language that solves its particular problem. For example, the first level 2 of the pyramid representing assembly language is quite broad because it symbolizes that virtually any software application could be written in assembly language. In other words, assembly language is very general, but not extremely powerful for any given application because it has little structure. Assembly language is especially suited for applications such as device drivers. Level 4 represents the C programming language that is suitable for writing an application such as a function library. While slightly less general than assembly language, the C programming language is more powerful.

In a similar fashion, the C++ and object-oriented programming languages represented in level 6 are even more powerful because of the object concepts they introduce. These languages are suited for implementing a compiler for example. Level 8 represents the class of object modeling languages and is quite narrow, indicating that it is suitable for narrower classes of applications such as airline reservation systems, databases, and other complex systems. The Unified Modeling Language (UML) is one such language.

At the top of the pyramid is the development tool 10 of the present invention symbolizing a slightly less general programming language than the previous languages, but much more powerful for matching applications. Development tool 10 is especially suited for complex, real-time intelligent control applications, and in particular works extremely well with complex electromechanical systems. By focusing on a particular problem domain, immense power is gained. Tool 10 provides a framework that helps define a problem so that implementation can begin immediately. Run-time facilities are provided that solve large parts of the problem. Mundane tasks are automated so that complex system development is made easier. Development tool 10 may be implemented in any suitable programming language; the JAVA programming language has been found to work well. Tool 10 also provides a graphical user interface that represents objects graphically and allows a programmer to connect objects. Such graphical tools that allow graphical interconnection between objects are well-known in the art. For example, this aspect of the present invention may be implemented using one of the UML tools such as Rational Rose.

Development tool 10 allows a team to directly implement a solution. One can start at a high level developing an overall system plan, yet can build a plan using well-defined structures that are sufficiently general to solve many types of complex control problems. Structures such as data flow diagrams, state machines, and composite object groups (COGs) are used to build a working system. Although the term "system" is often used to refer to both the hardware components and the software of a complete solution to a real-time application, as used herein "system" refers to the user-created software that is eventually loaded onto a real-time computer. And although tool 10 is referred to as a development tool, it also provides run-time support for the system that is loaded.

Figure 2:
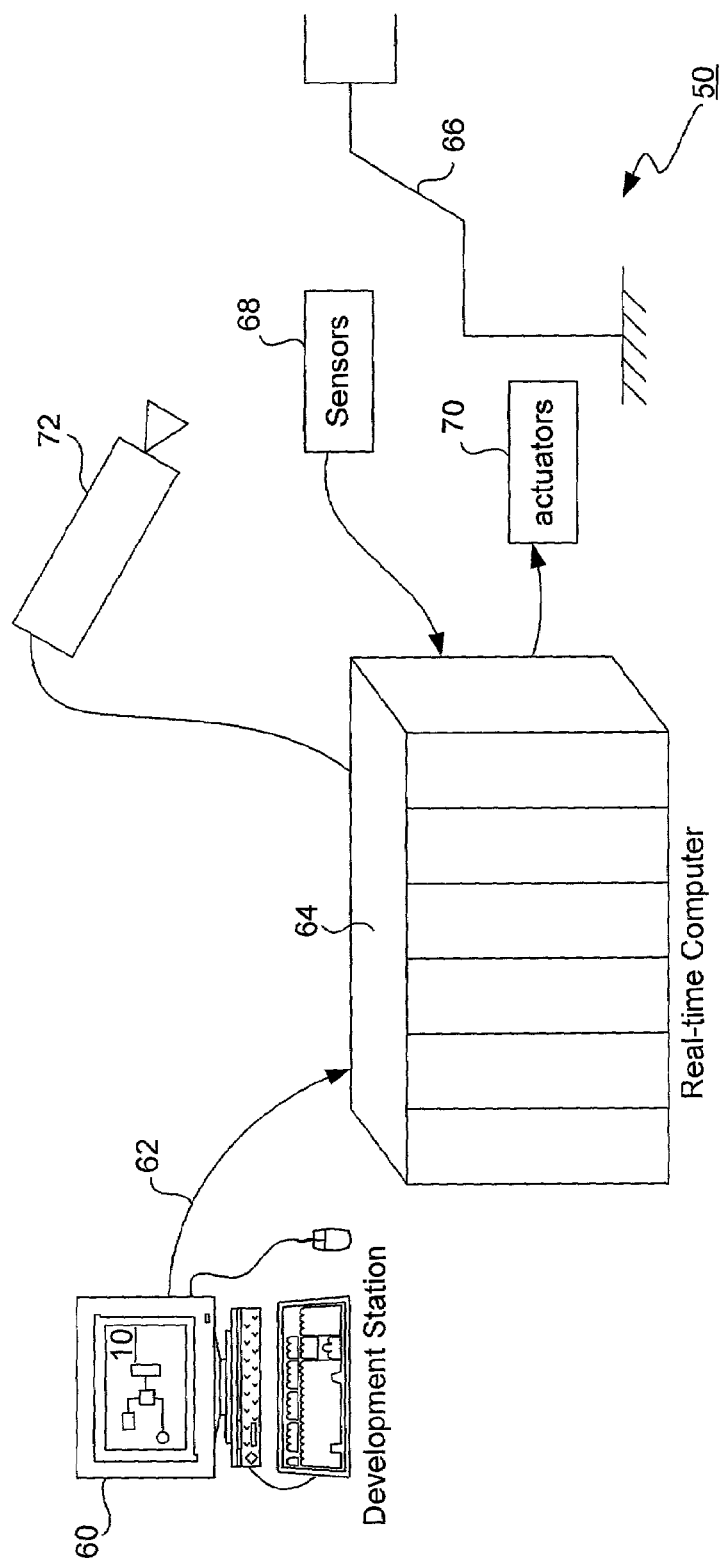
FIG. 2 illustrates an example of a real-time application according to one embodiment of the present invention.

FIG. 2 illustrates an example of a real-time application 50 according to one embodiment of the present invention. In a typical scenario, a real-time system is created on a development station 60 using development tool 10 and is then downloaded to a real-time computer 64 for execution. Computer 64 then controls the hardware of the application. Development station 60 is any suitable computer such as a personal computer or a work station on which a system is created. Shown symbolically on development station 60 is development tool 10 of the present invention which provides a design environment for the creation of the system. Development tool 10 is used by an individual or individuals to design the system, implement the design, generate compiled code, and execute the system code.

Once compiled, the real-time system code including individual compiled components and system diagram files are downloaded over a network connection 62 (or any other suitable interface) to real-time computer 64. Computer 64 may be any of a wide range of computing devices for use in a real-time system. By way of example, computer 64 may range from a simple printed circuit board up to an IRIX supercomputer.

Real-time computer 64 controls any of a wide variety of hardware, which in this example is illustrated as a simple robot arm 66. In this simple example, computer 64 receives information regarding arm 66 via sensors 68 and controls arm 66 using actuators 70. Any of a wide variety of sensors and/or actuators may be used and are well-known in the art. Examples of sensors include analog-to-digital converters, encoders, and force sensors. Examples of actuators include motor control cards, digital-to-analog converters, solenoids, and valve controllers.

Furthermore, computer 64 may communicate with any of a wide variety of other hardware devices for the purpose of operating the real-time application. By way of example, computer 64 also receives information from a vision device 72. Other devices include part conveyors, end-effector devices (e.g. grippers), user input panels, part feeders, etc.

Although only a simple example specific to robotics is provided, those of skill in the art will appreciate that development tool 10 may be used with a wide variety of real-time applications that are much more complex.

Figure 3:
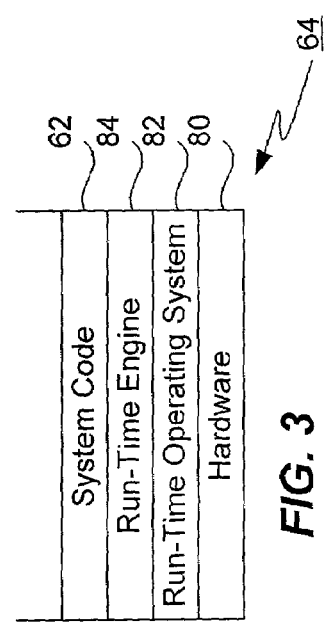
FIG. 3 illustrates symbolically the makeup of a real-time computer.

FIG. 3 illustrates symbolically the makeup of real-time computer 64. In this simple example, at a low level computer 64 includes hardware 80 such as a CPU and other electronic circuitry for operation of the computer. Any suitable run-time operating system 82 is present in hardware 80 and facilitates operation of the overall real-time application. By way of example, run-time operating system 82 may be an operating system such as VxWorks from Wind River Systems of Alameda, Calif. Run-time engine 84 is software that executes the user real-time system allowing control of the application hardware devices. Engine 84 loads system code 62 from station 60 and allows the system code to run. System code reads sensors 68, writes to actuators 70, and in general oversees execution of the real-time application.

Although it is possible for system code 62 to be loaded as one large object directly onto operating system 82, it is preferable that code 62 be loaded as individual objects onto run-time engine 84 as will be explained below.

COMPONENTS

Preferably, tool 10 allows an application programmer to graphically connect components in order to build up a diagram representing an intelligent control system. It would be possible, however, for embodiments of the present invention to be implemented without a graphical interface, although one is preferable. In a general sense, components are the pieces or parts representing physical and/or logical entities that make up a control application. For example, a component may represent a controller, a state machine, a trajectory generator, a subsystem, etc.

In a preferred embodiment of the invention, components are implemented as objects according to the class-instance object-oriented programming model. Other programming models such as the object programming model and the object prototype model may also be used. Objects may be implemented in any suitable programming language, and the C++ programming language has been found to work well.

Component Types

In one embodiment of the present invention, components are objects having a graphical representation and include the following: atomic components (ATCs); data flow components (DFCs); state transition components (STCs); interface components (IFCs); finite state machine components (FSMs); and composite object groups (COGs). The first four types of components are primitive components in that they are implemented directly in code, while the last two components are composite components in that they may be represented using other types of components.

Each type of component is described in more detail below. In general, as objects, each component has the capability to include attributes (data values) and methods (its "interface"). An interface of an object includes the attributes of that object or its "pins." Some components divide attributes into input pins, output pins, and reference pins. An input pin is a value needed by a component to execute. An output pin is a value output by a component to another component. A reference pin is a value associated with a component that is relatively stable, such as a gain for a controller or a parameter that is always available. Reference pins are well-suited for constant values for a component such as floating point values, hardwired addresses, strings, etc. In general, a pin of a component is a data type that is a connection to the world outside the component. Methods may be divided into methods that the component "provides" (implements) and those that the component "uses" (invokes).

Atomic Components

Atomic components are objects that are directly implemented in C++ code and are the lowest level of granularity of all the components. The role of an atomic component is to provide generic utility functions or services to other components within a diagram. In effect, an atomic component extends the capabilities of the diagram in which it is contained, a diagram that otherwise would not have any user-defined C++ code associated with it. For example, atomic components may be inserted into a composite object group or state machine diagram to extend the capabilities of that diagram. Preferably, each atomic component has at least one method that can be called by other components. This method can be programmed to perform any function that the programmer desires.

An atomic component may also be created by using existing or legacy code. A programmer first uses an interface editor to describe the interface for the atomic component (i.e., methods it implements, and/or data it uses) and then supplies the actual code to implement the method for the atomic component. The existing code may be simply copied over into the new atomic component, or if it is a large legacy system, the atomic component may call the legacy code to implement its methods.

Data Flow Components

Figure 4:
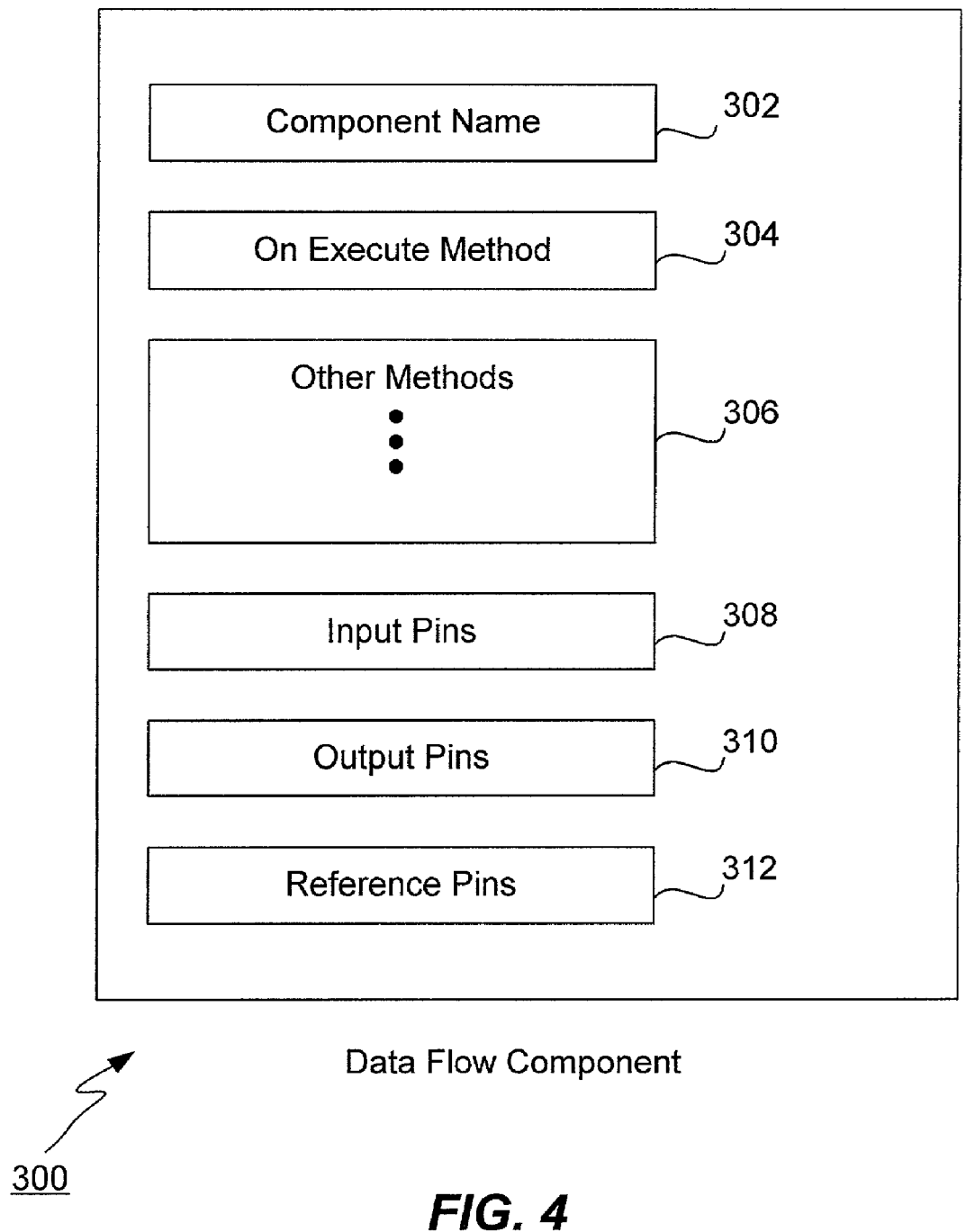
FIG. 4 illustrates symbolically a data flow component.

FIG. 4 illustrates symbolically a data flow component 300. A data flow component is one example of an atomic component that is used to build the physical parts of the control system. Data flow components perform control, data acquisition, motion generation, signal processing and other electromechanical functions. As such, a data flow component implements cyclic (or sampled-data) processing within a control system. Examples of real-world components that may be modeled using a data flow component are: filters, trajectory generators, controllers, matrix operators, and most any mathematical function that takes inputs and calculates outputs. Non-mathematical components may also be modeled.

Figure 14:
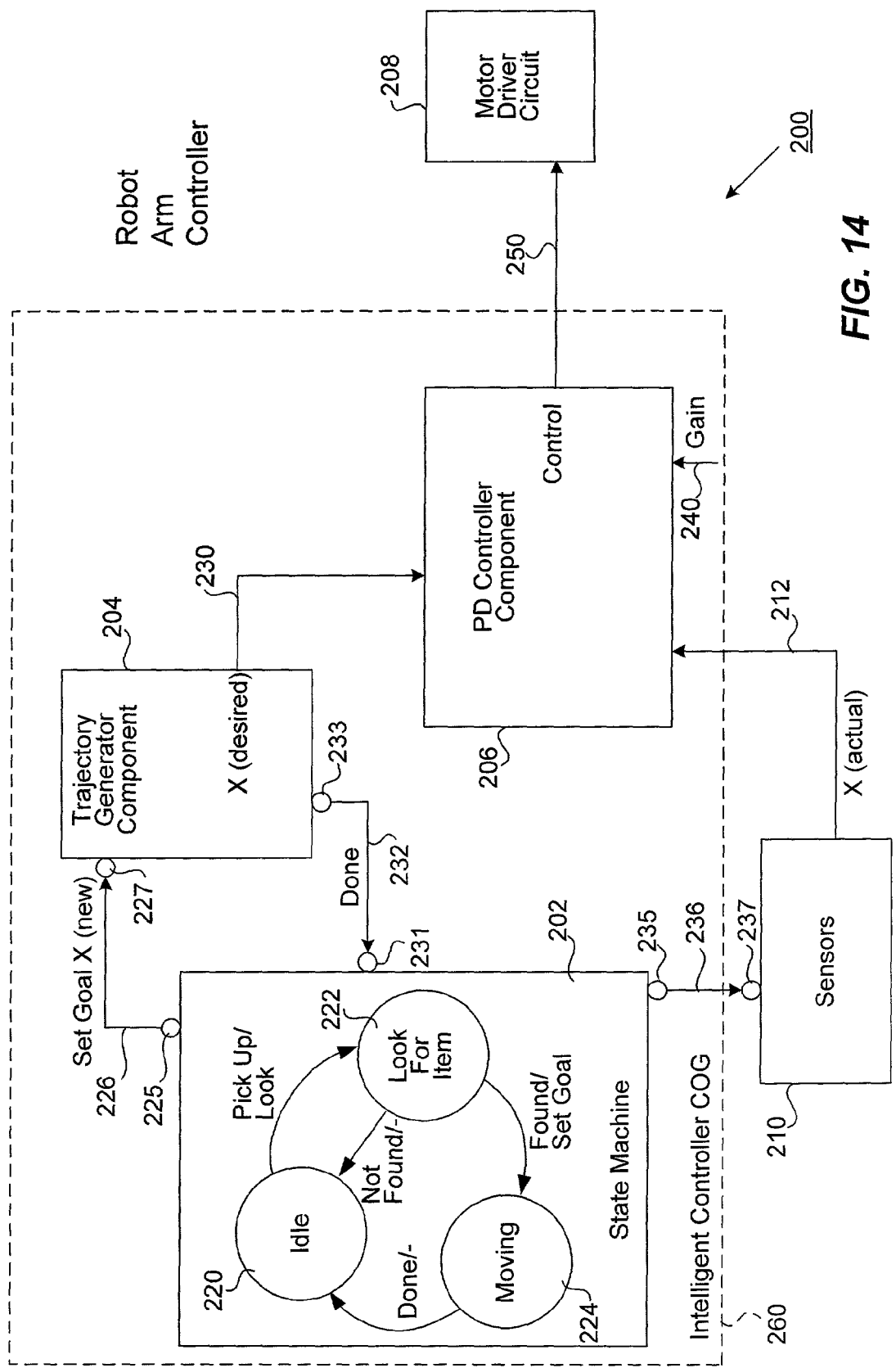
FIG. 14 illustrates a very simplistic robot arm controller that provides a simple example of a composite object group (COG) and of various interfaces.

Data flow component 300 includes a component name 302 that indicates the type of real world component being modeled. Each data flow component 300 has an "On Execute" method 304 that is executed automatically every sample period and any number of other methods 306. Preferably, the On Execute method is a custom method written by a programmer for performing a particular function. In the example of FIG. 14, the trajectory generator data flow component uses its On Execute method to calculate a value for X(desired). The data flow run-time engine will call the On Execute method of each data flow component every clock cycle. The On Execute method then reads values from its input pins 308, any reference pins 312, and calculates values for output pins 310 using an appropriate method.

Input pins 308 and output pins 310 are important for scheduling of the execution of the data flow component. In one embodiment of the invention, the On Execute method may not run until all input pin values are available, and its output pin values may not be used until its On Execute method has executed. An application programmer connects any number of data flow components (along with other components if desired) to create a data flow diagram that forms a portion of the control system. Advantageously, data flow components are objects having traditional methods and attributes, yet also provide real-time sampled-data processing by virtue of the On Execute method of each data flow component. Furthermore, the explicit definition of input pins and output pins allow a programmer to specifically define which data values must be available before the component executes, and which output values will be available after the method executes.

As will be described below, the run-time engine will use the specified input and output pins to perform sorting of all data flow components to decide in which order they are to be executed. Data values not intended to be used for sorting—or are both input and output values—may be defined as reference pins 312. Each data flow component may also implement other methods 306 to provide specific functionality. These other methods may be called automatically by the run-time engine in response to well-defined events during operation of the system.

State Transition Components

Figure 5:
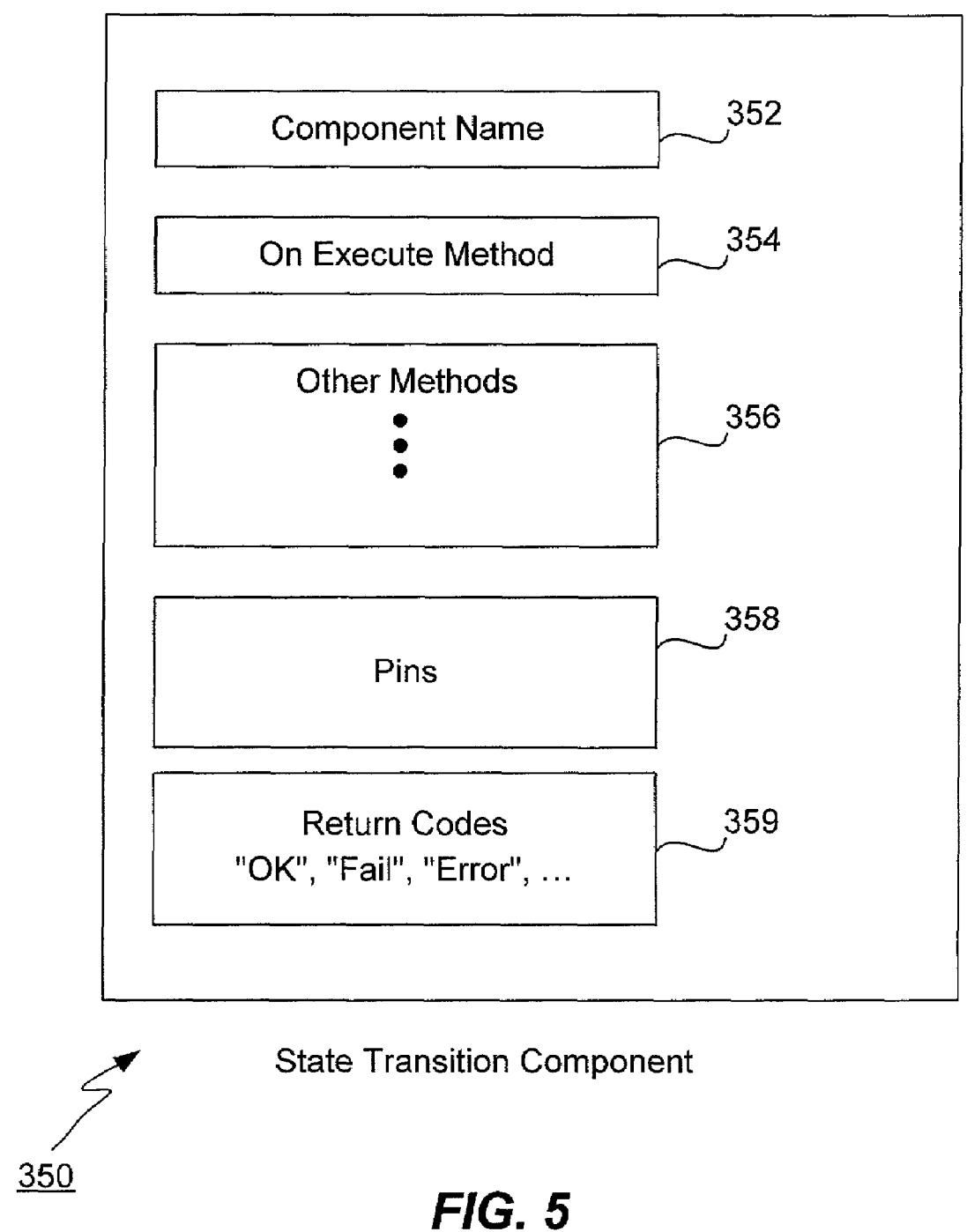
FIG. 5 illustrates symbolically a state transition component.

FIG. 5 illustrates symbolically a state transition component 350. State transition components are atomic components that are used to define sequencing, to process logic, and to provide the "what to do" strategy needed by the control system. In general, state transition components provide the actions to be taken by a state machine in response to stimuli or events. Preferably, a state transition component is only inserted into a state machine component.

State transition component 350 has a component name 352 and an On Execute method 354. The On Execute method 354 will be called by the state machine run-time engine when a corresponding event occurs as will be explained below. Component 350 may include any number of other methods 356 and also includes any number of pins 358; pins are data values either provided by the state transition component or that are made available to it.

Figures 6A, 6B, 6C:
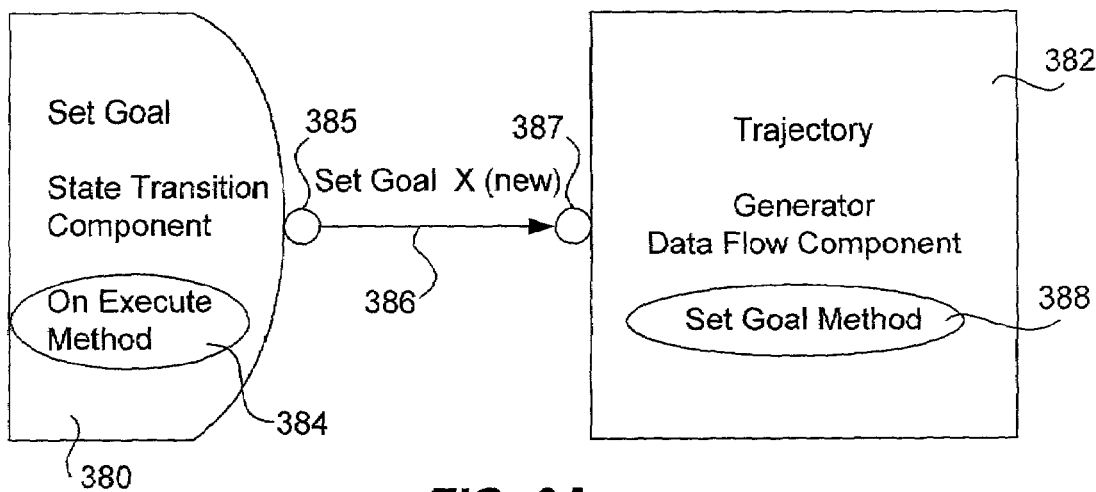
FIG. 6A shows symbolically a state transition component in communication with a data flow component.
FIG. 6B illustrates in greater detail how a state transition component calls a method of a data flow component.
FIG. 6C illustrates in greater detail how a method of a data flow component calls an internal method.

State transition component 350 may be associated with any of a variety of events within a state machine. The On Execute method 354 provides an action to be taken based upon a current state of a state machine and an event that occurs. By way of example, FIG. 14 illustrates state machine 202 that makes use of state transition components. When the event "Pick up" is received while in state 220, state transition component "Look" is activated and its On Execute method will execute. In this simple example, the On Execute method of state transition component "Look" will implement a method that causes a vision system of the robot to begin looking for the item to pick up. Note that the events "Not found" and "Done" are not associated with any state transition components, presumably because no specific action need be taken when those events occur. The event "Found", which triggers a transition from state 222 to state 224, has an associated state transition component "Set goal" which calls the "Set goal" method of the trajectory generator component. FIGS. 6A and 6B illustrate in greater detail how a method call occurs.

Also included in a state transition component are user-defined return codes 359. A user may define any return code to be returned by the component's On Execute method. In this example, possible return codes include "OK", "Fail", and "Error." An OK return code might indicate that the On Execute method has executed successfully, while a Fail code indicates the method has failed to achieve its intended purpose. An Error code indicates an error detected while the method is executing. Advantageously, a programmer may define any number of return codes, one of which is returned by the On Execute method. One benefit is that the state machine run-time engine may then use a return code to control branching based upon a particular event. For example, when an event occurs triggering a particular transition, the execution of the associated state transition component might return one of many return codes. Based upon this return code, the run-time engine then decides to which state to branch. State diagrams are simplified because an extra state is not needed to serve as a decision point. The decision making is performed by the run-time engine using the return code and the state machine component definition. Further details on the state machine component and the state machine run-time engine are provided below.

Alternative Component Implementation

An alternate implementation is a single type of "primitive" component that is directly implemented in C++ code. Whether it is used as an "Atomic Component," a "Data Flow Component" or a "State Transition Component" is simply an attribute of the primitive component. One advantage of this approach is the ability to reuse the same code regardless of whether the component is used within a data flow or state machine diagram. (An advantage of the previously described implementation is that for each type of behavior of a component, there exists an explicitly named component.)

For example, consider the situation in which a DFC is already written to add two matrices. To create an STC that also adds two matrices, the user has to duplicate the code. In this alternate implementation where the same component that adds two matrices can be used as a DFC or STC, the user writes the code once. The data flow engine calls the On Execute and On State Update methods of the component, and the finite state machine engine calls the On Transition method of the component. (The On Execute method of a state transition component may be renamed "On Transition" to avoid confusion.)

Component Integration

Advantageously, the data flow, state transition and state machine components are all implemented as objects according to any suitable object-oriented programming model. Such implementation as objects greatly facilitates making interconnections, system design and code reusability. For example, any of the On Execute method, methods 356 and pins 358 of component 350 may be connected to any data flow component or other component in a system diagram. For example, any of the methods may call another method in a data flow component, and conversely a method of a data flow component may call one of the methods 356 in a state transition component. Additionally, any of pins 358 may be connected to an input pin of a data flow component in order to provide data to that component; conversely, an output pin of a data flow component may provide a data value to one of pins 358 of state transition component 350. In this fashion, the present invention provides integration between the sampled-data processing world of data flow components in a data flow diagram, and the event processing world of a state machine.

FIGS. 6A, 6B and 6C illustrate in greater detail how state transition component Set Goal of FIG. 14 performs a particular action in response to an event. FIG. 6A shows symbolically state transition component Set Goal 380 in communication with data flow component Trajectory Generator 382. Component 380 includes its On Execute method 384 which is shown graphically via arrow 386 as implementing a call to the Set Goal method 388 of component 382.

FIG. 6B illustrates in greater detail how On Execute method 384 of state transition component 380 calls a method of a data flow component. Method 384 shows in very simple pseudo code that the On Execute method includes a simple call to the "Do Set Goal" method (bubble 385) of its own component 380. Arrow 386 translates the call to Do Set Goal method 385 into a call to the Set Goal method 388 of component 382 via bubble 387. This translation is performed by the linking phase of FIG. 20 at run time.

FIG. 6C illustrates in greater detail how Set Goal method 388 of data flow component 382 calls an internal Compute Trajectory method to perform the actual work of computing a new trajectory to the specified goal position. Method 388 shows in very simple pseudo code that the Set Goal method includes a simple call to the Compute trajectory method of Trajectory Generator 382. In this fashion, whenever the On Execute method 384 of component 380 is executed, it will call the Compute Trajectory method of Trajectory Generator 382.

The code within Set Goal component 380 does not have specific references to Trajectory Generator component 382 (or any other component), making Set Goal component 380 a much more reusable component. Just by connecting arrow 386 to another component that provides a Set Goal method automatically changes what gets called when On Execute method 384 of component 380 is executed, without having to change any code in Set Goal component 380.

State Machine Components

Figure 7:
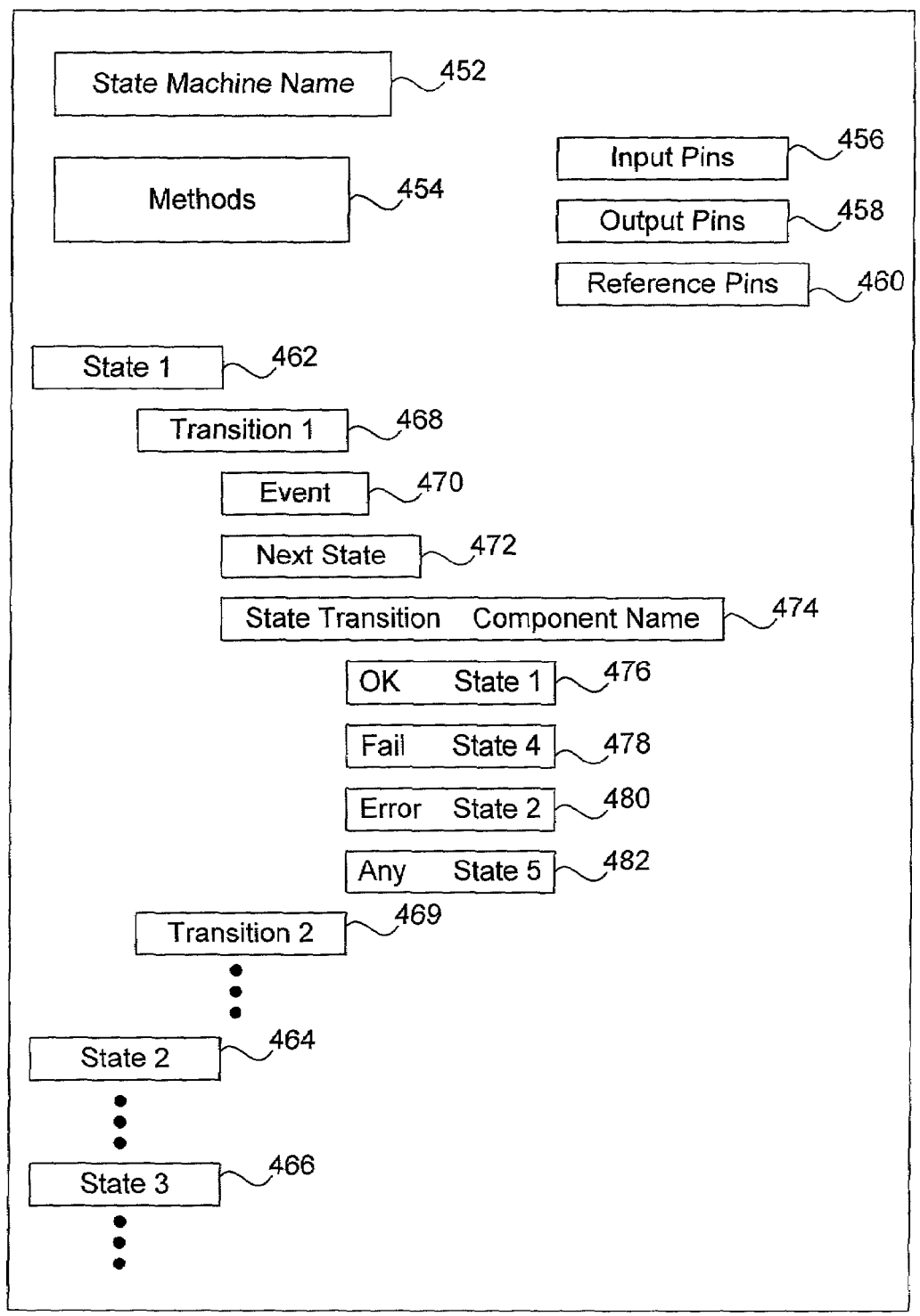
FIG. 7 illustrates symbolically a state machine component.
Figure 12:
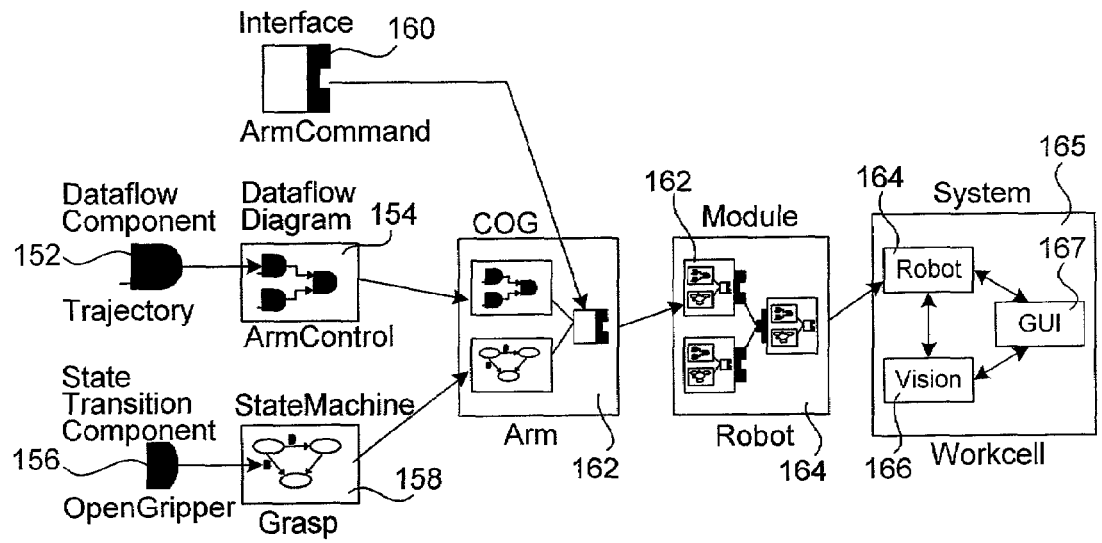
FIG. 12 illustrates a methodology for creating a robot control system.
Figure 13:
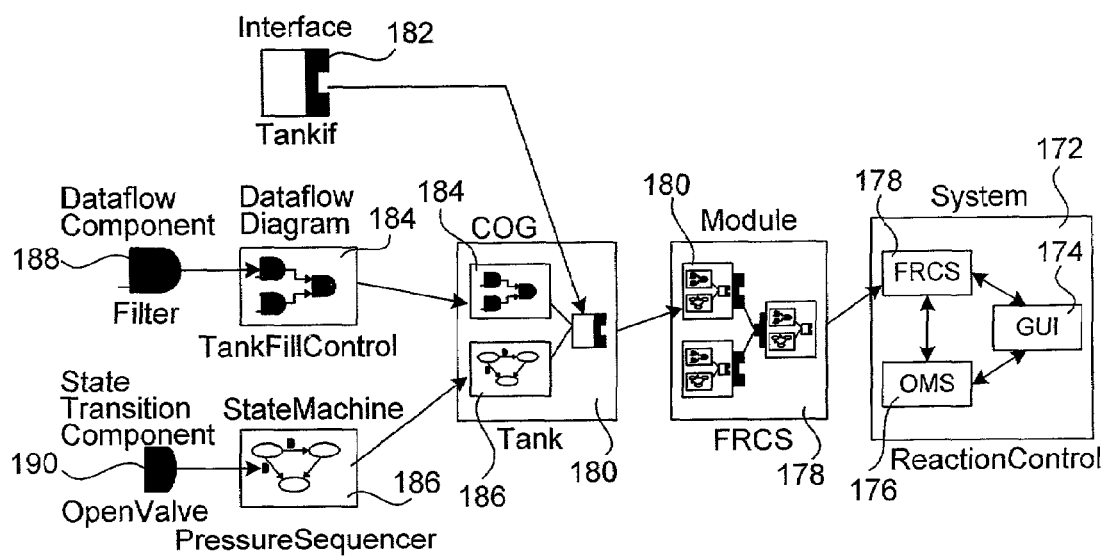
FIG. 13 illustrates a methodology for creating a reaction control system.

FIG. 7 illustrates symbolically a state machine component 450. State machine component 450 is a composite component built graphically within a system diagram that represents a finite state machine. As is known in the art, a finite state machine uses a state transition diagram to describe and implement event-driven processing. Component 450 may be implemented as either a synchronous or asynchronous state machine. In general, event-driven processing is provided for a composite object group by creating a state machine component and inserting the component into the composite object group. In a preferred embodiment of the invention, creation of a state machine is performed graphically in which states, events and state transition components are identified and connected together. FIGS. 12-14 provide simple examples of state machine components built graphically. A state machine may also be viewed in the atomic sense in that each state of a state machine may itself be a state machine, thus providing a hierarchy, if desired.

Component 450 includes a state machine name 452. As this component is implemented as an object, it may also include any number of methods 454 as well as input pins 456, output pins 458 and reference pins 460. Each state machine component has any number of states 462, 464, 466, etc. In this simple example, only details of state 462 are presented. Associated with state 462 are any number of transitions 468, 469, etc. A transition for a state provides a triggering event that indicates the state machine should transition to a new state, along with an action to be taken during that transition. In a preferred embodiment of the invention, transition 468 includes a received event 470, a next state 472 and a state transition component name 474. In operation, when event 470 is received, state machine 450 transitions from state 462 to next state 472 and also provides an action to occur during that transition.

Advantageously, the present invention provides an action to occur during transitions by way of state transition components. In this example, state transition component 474 is executed during transition 468. More specifically, the On Execute method of this state transition component will be called when transition 468 occurs. It should be appreciated that any number of state transition components may be associated with a particular transition, and that more than one event may be associated with a transition. In this example, the programmer of component 450 has provided specific state transitions 476-482 to occur based upon the return code from state transition component 474. These return codes may very well override a transition to next state 472. For example, based upon a return code of "OK," state machine 450 transitions to state1. When a "Fail" return code is received, the state machine transitions to state4. Other return codes may produce transitions to other states. A special return code "Any" provides a transition to state5 if any other return code is received other than those codes 476-480. Advantageously, such a state machine component definition provides decision making control through the use of state transition components. As will be explained below, the state machine run-time engine will perform a transition for the state machine based upon the resulting return code.

Interface Components

Figure 8:
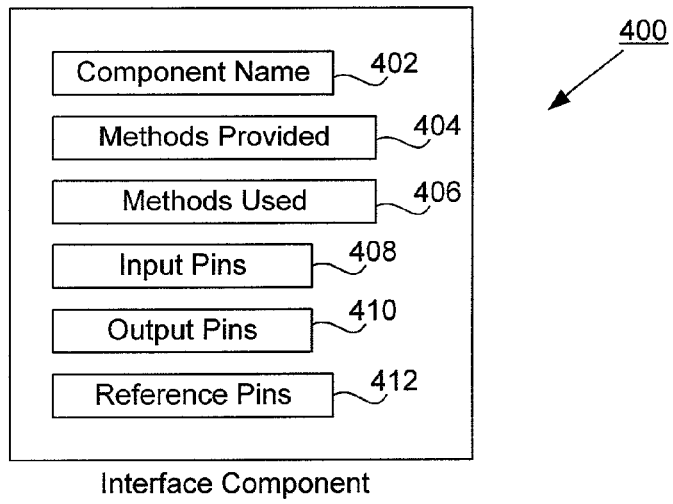
FIG. 8 illustrates symbolically an interface component.

FIG. 8 illustrates symbolically an interface component 400. An interface component represents a commonly used interface that is reusable. By representing a common interface as an object-implemented component, the present invention provides an interface that can be reused to simplify a system design. For example, certain sets of data and function calls always appear together. These sets of data and function calls are good candidates for creating new interface components. Other good candidates are interfaces to general classes of equipment, instrumentation, or devices: a power supply interface, a pressure valve interface, a sun sensor interface, an XY stage interface, a motion generator interface, etc.

For instance, a system may have many different power supplies, with different power ratings, turn on/turn off sequences, etc. Nevertheless, these differences may be isolated with a single well-designed power supply interface component. Each power supply implementation will be specific to the actual underlying hardware. For example, the turn on/turn off procedure for large power supplies often involves a sequence of relays that must be thrown in addition to safety checks. A single power supply interface component may be used as a standard in a system for all power supply implementations. Such a common reusable interface component simplifies system design and such a system using that interface component will be able to use any power supply implementation.

In one embodiment of the invention, an interface component is a graphical representation of the interface of an object. For example, if an object has associated with it two methods and three data values, a traditional approach would be to attach five graphical lines to the object to represent these two methods and three data values. An interface component is a single icon that represents the connection of these two methods and three data values and has a single connection from it to another object. Once an interface has been defined for a particular object, an interface component may be created that represents this interface and the interface component may be reused on similar types of objects. An interface component may be defined for, and used with, any component within the system.

Interface component 400 includes a component name 402, a list 404 of the methods provided by the component to which the interface attaches, and a list 406 of the methods that will be used (i.e., called) by the component to which the interface is attached. Also included are the input pins 408 indicating data values to be input to the component to which the interface is attached, and output pins indicating data values to be output. Reference pins 412 indicate reference data values used by the component to which the interface component is attached. In a preferred embodiment of the invention, an interface component is represented graphically.

One should distinguish an interface component 400 from the interface to any type of component. The interface component is a reusable combination of pins and methods implemented as an object; instances may be created of each interface component. The interface to a component is simply a group of pins and methods, specific to that component. In fact, the interface to a component may contain interface components in addition to specific pins and methods.

Thus, an interface component may be specified as part of the interface to another component. When so specified, the instance of the interface component is said to be "attached" to the component. For instance, a data flow component might have simple numeric inputs for "current position" and "desired position." If an interface component containing pins for "limit" and a method "enable" is attached as well, then this data flow component will have access to all three inputs (current position, desired position, limit) as well as to the method "enable". Thus the data flow component easily gets access to all the pins and methods that the interface component contains.

Composite Object Group (COG) Components

Figure 9:
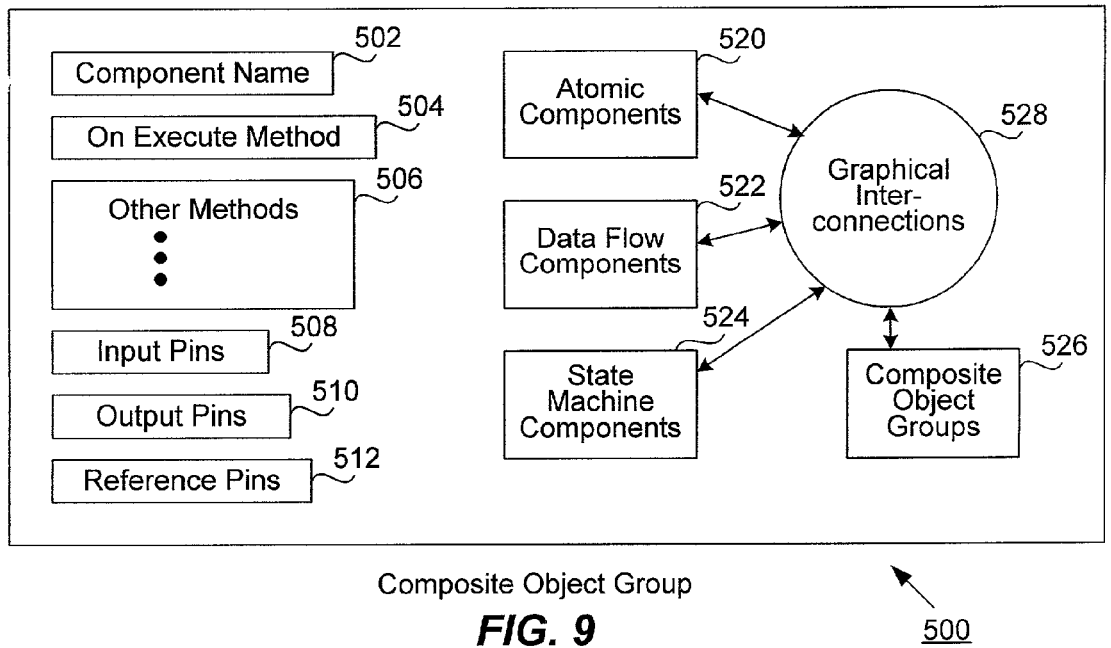
FIG. 9 illustrates symbolically a composite object group (COG) component.

FIG. 9 illustrates symbolically a composite object group (COG) component 500. A COG is a composite component that is built graphically using development tool 10 in the process of producing a system diagram 136. In fact, the final system diagram 136 is itself a COG. A COG encapsulates both sampled-data elements and event-driven elements into a single object, so that a COG can be used to model physical entities in a system. Although a COG may be built using code without the benefit of a graphical user interface, in a preferred embodiment of the present invention each COG is built graphically. Examples of COGs being built graphically are shown in FIGS. 12-14.

Externally, a COG is viewed as a graphical component with a set of defined methods and pins (its interface) that connect with other components. Internally, a COG is a hierarchical diagram that contains many types of components. Because a component within a COG can also be a COG, this hierarchy can be used to subdivide system models hierarchically into finer, more manageable pieces, and to group a set of components into a reusable unit.

COG 500 includes a component name 502. The OnExecute method 504 of COG 500 will execute when COG 500 is scheduled for execution by the run-time engine. It in turn executes all the OnExecute methods of the data flow components and sub-COGs contained in COG 500. In one embodiment of the invention, COGs and the components within them are scheduled for execution in a recursive manner. For example, starting with the top-level COG, its constituent components (which may be other COGs, data flow components, etc.) are sorted into a dependency order and schedule for execution in that order. Once that level has been sorted, the COGs within that level are then analyzed to determine a sorted order for the components that they contain. This sorting by dependency continues to the lowest level. In this fashion, all COGs and data flow components of a system are sorted by their dependency. An example of how data flow components in particular may be scheduled and executed is provided below in FIGS. 21 and 22.

As this component is implemented as an object, it has an interface that may include any number of other methods 506 as well as input pins 508, output pins 510 and reference pins 512. The interface for a COG lists not only the methods that a COG implements or "provides," but also the methods that a COG "uses," i.e., those methods provided by other components. An input pin is a value needed by a COG to run. An output pin is a value output by a COG to another component. A reference pin is a value associated with a COG that is relatively stable. Advantageously, pins of one COG connected to pins of another COG pass data instantaneously through the system. A COG need not wait for a method to be called to receive the value for an input pin, nor need to call a method to output a value on an output pin. As soon as the data is available at a pin it is there to be used by the appropriate COG.

Also included within COG 500 are any number of atomic components 520, data flow components 522, state machine components 524 and other composite object groups 526. In this fashion, each COG can represent hierarchically the organization of a particular application. In a preferred embodiment, these components 520-526 are interconnected with graphical interconnections 528 using a graphical user interface. These interconnections define how data flows between components and which methods of certain components are called by methods of other components. For example, FIG. 14 shows interconnections 226, 230 and 232.

The sampled-data processing portion of a COG is built as an interconnected set of data flow components 522 and other COGs 526. This set of data flow components and COGs forms a data flow diagram. Each component within the data flow diagram represents a block of code that will be executed. Each component may use input data, generate output data, or do both. The input/output dependencies of the data flow diagram are used to specify how data flows through the system. Preferably, the data flow executes at every sample period of the system. The event-driven processing portion of the COG is represented by any number of state machines 524. As previously described, each state machine provides states, events, transitions and actions to be executed upon each transition. In this fashion, a COG advantageously provides a comprehensive building block for intelligent control systems.

Control System Creation Overview

FIGS. 10-13 present different view points on the creation of a control system. These figures provide a high level discussion, further details are provided below in the flowcharts of FIGS. 18-23.

User Roles

Figure 10:
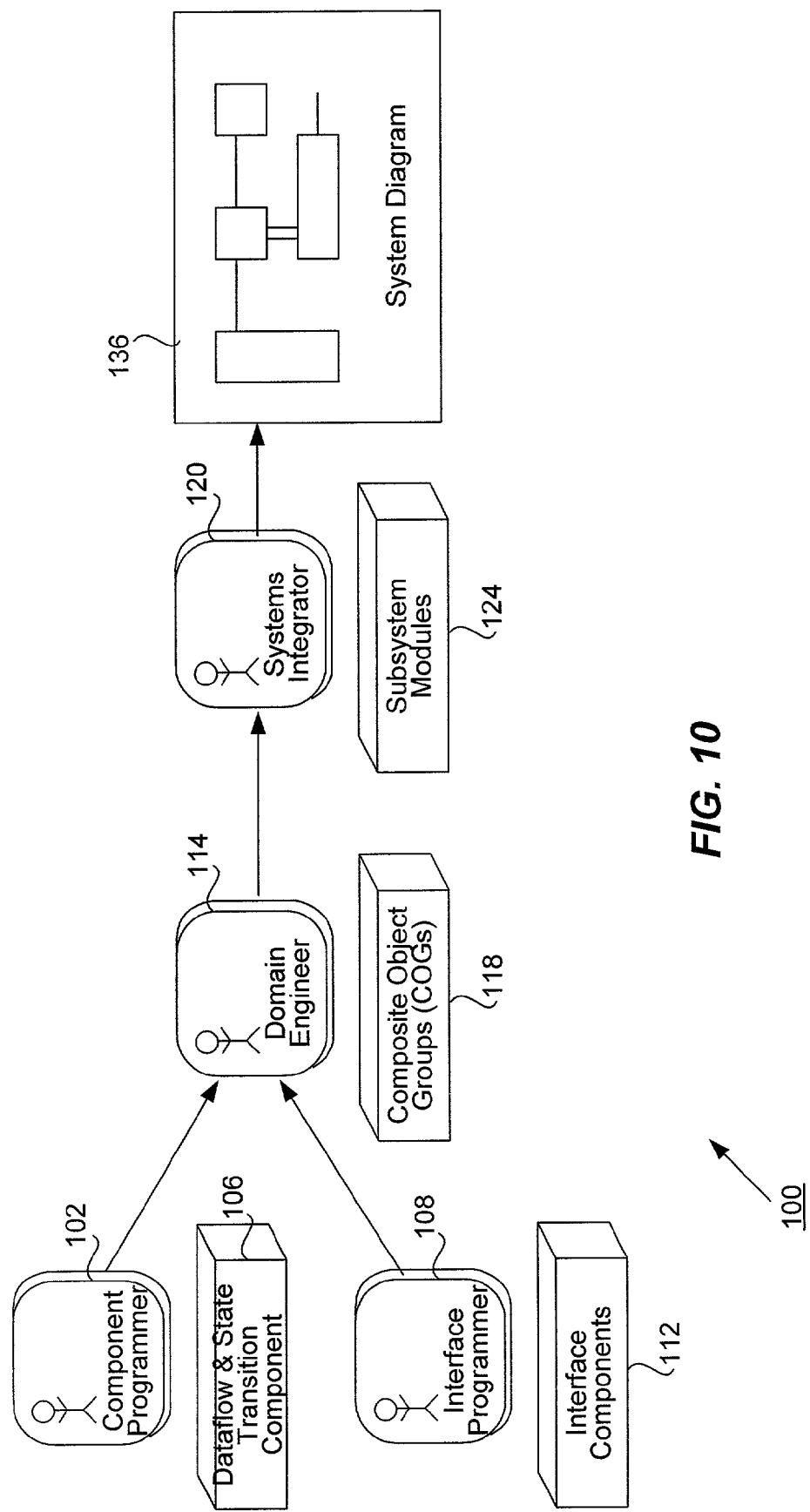
FIG. 10 illustrates graphically a programming process and the roles that various individuals may play in creating a control system.

FIG. 10 illustrates graphically a programming process 100 and the roles that various individuals may play in creating a control system. A component programmer 102 uses any suitable editor to create atomic, data flow and state transition components 106. Programmer 102 defines interfaces for these components and writes code to implement the methods of these components. Preferably, programmer 102 is proficient in a language such as C++. In a similar fashion, interface programmer 108 uses any suitable editor to create interface components 112. Interface components 112 are objects that define a reusable interface. Programmer 108 defines the methods and attributes for each interface. Although a reusable interface component may be desirable, they are optional.

Domain engineer 114 uses previously created components 106 and 112 to create any number of composite object groups (COGs) 118. Preferably, domain engineer 114 uses graphical development tool 10. Domain engineer 114 may also use existing state machine components and COGs and may define other components in the creation of COGs 118. Once COGs 118 have been created, systems integrator 120 uses development tool 10 to produce subsystem modules and to integrate these subsystem modules into a final control system in the form of system diagram 136. Finally, the system is loaded onto a real-time computer to control the application in question. Of course, these roles may be performed by the same individual.

Programming Process

Figure 11A:
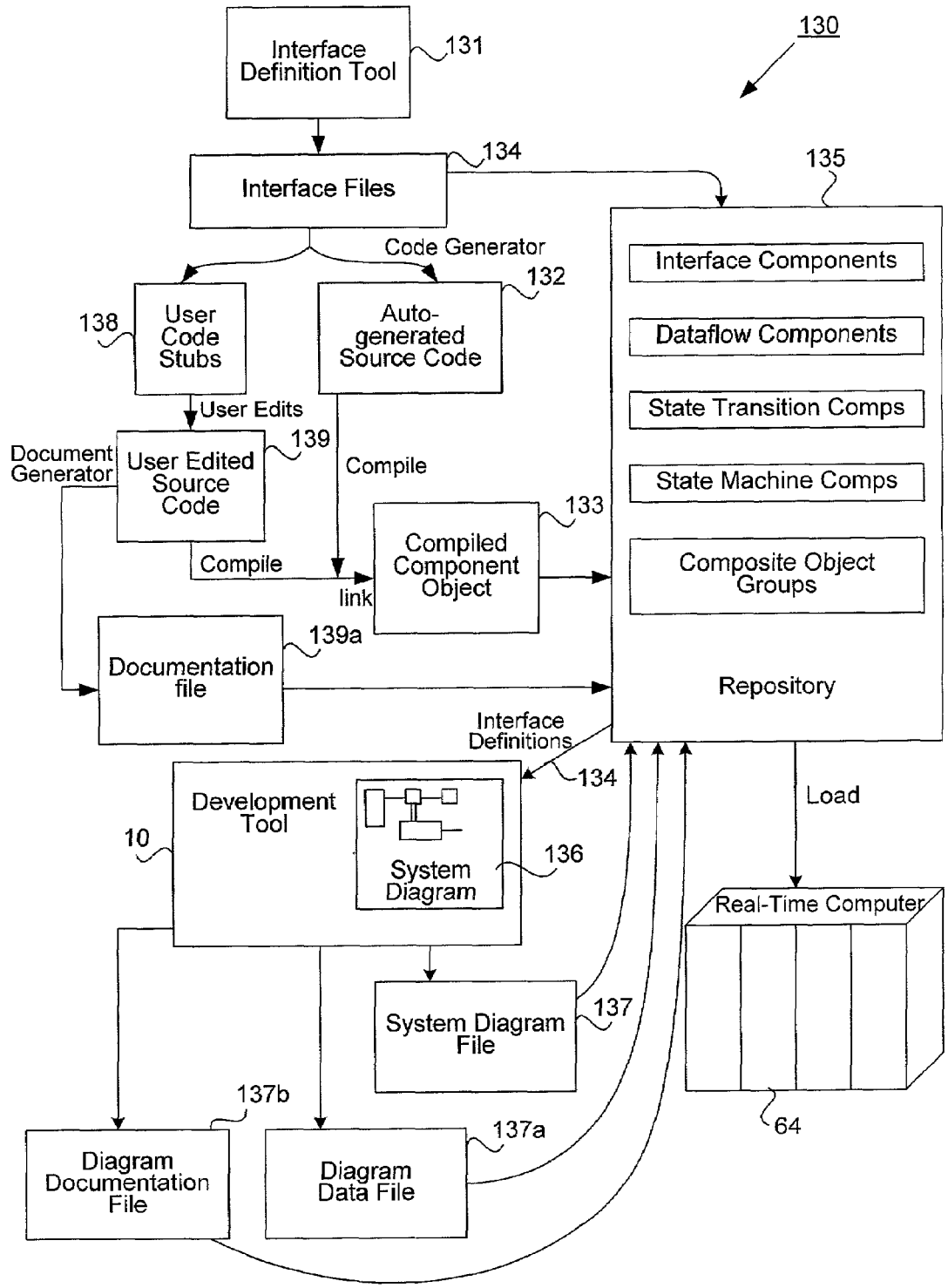
FIG. 11A illustrates a programming process for producing a real-time intelligent control system.

FIG. 11A illustrates a programming process 130 for producing a real-time intelligent control system. Interface definition tool 131 represents symbolically an initial step in which interfaces for desired components are created. Tool 131 is used by a programmer to define an interface for each component desired to be used in the system. It should be noted that tool 131 is used to assist in the creation of components that a programmer needs that do not already exist. Other components that a programmer will use in developing a system may already have been defined and implemented, and be represented in repository 135.

Repository 135 is any suitable database on a computer for storing components and their associated collection of files that define them. Repository 135 is preferably implemented in a hierarchical directory structure and is described in greater detail in FIG. 11B.

Figure 15:
FIG. 15 is a textual representation of an interface for a trajectory generator.
Figure 16:
FIG. 16 is a textual representation of an interface for a PD controller.
Figure 17:
FIG. 17 is a textual representation of an interface for an intelligent controller COG.

Types of components for which specific interfaces may be defined include atomic, data flow, state transition, and state machine components as well as composite object groups. The definition of an interface for an object is well-known to those of skill in the art and generally includes defining the attributes (referred to as "pins" herein) of an object and the methods that it provides and uses. By way of example, FIGS. 15-17 illustrate interfaces for various components of FIG. 14. Although the preferred implementation uses a graphical tool to capture interfaces, it is similar to the manual method that those skilled in the art utilize with a text editor.

Primitive Component Creation

Tool 131 results in the formation of an interface file (also termed a "definition file") for each component defined. The interface file defined for each component is stored in repository 135 in association with that particular component. In one embodiment, interface files are named after the component to which they correspond. For example, a COG has a ".cog" interface file, a state machine has an ".fsm" file, a data flow component has a ".dfc" file, a state transition component a ".stc" file, an atomic component a ".atc" file, an interface component a ".ifc" file, etc. An interface file provides interface information for its component such as inputs and outputs, method names, etc. Other information may also be stored in an interface file. For example, the ".cog" and ".fsm" interface files corresponding to COGs and finite state machine (FSM) components also contain an indication of to which mode the COG or FSM belongs, to which executable image the COG or FSM belongs, and to which thread the COG or FSM has been assigned. Modes, executables and threads are described in more detail below in the section on mapping.

Once an interface 134 has been defined using tool 131, a suitable code generator is used to produce an automatically generated source code file 132 that contains code to instantiate and use the component at run-time. In one embodiment, a class definition is generated that has fields for each data value (pin) and/or method defined for the component. Automatically generated methods include access methods, initialization hooks and status methods. The code generator also automatically generates dummy functions (stubs) 138 used by a programmer to fill in the methods that the component implements. Specific types of components have "standard" stub functions. For example, data flow components have an OnExecute function, a state update function, functions that are called when the execution starts and stops, mode change functions and more.

The user may edit the stubs file 138 to produce a user-edited source file 139. In one embodiment, a suitable compiler compiles the automatically-generated and the user-edited source code into compiled objects. These compiled objects are linked together into a single compiled object 133 for each component. This compiled code object file 133 for an individual component is stored in repository 135 in association with the defined component. The object file is loaded during system initialization and linked with other component objects on the real-time computer to form the complete executable system.

The user-edited source code can also be processed by a document generator, which creates documentation files 139a in a format suitable for human viewing. In one embodiment, these are HTML-format files viewable with a browser. The documentation files are also stored in the repository 135.

Composite (Diagram) Component Creation

Using a suitable graphical user interface of development tool 10, a domain engineer uses interface files 134 stored within repository 135 to produce a system diagram 136 that represents the intelligent control system. Although it is contemplated that the present invention may be implemented without the benefit of a graphical user interface, it is preferred to use one. In a preferred embodiment, each component defined by a particular interface file is represented by a unique graphical icon within system diagram 136. The domain engineer is able to browse repository 135 picking and choosing those components he or she needs to create system diagram 136. The system diagram is saved as a system diagram file 137 (for instance a COG or a state machine), and stored within the repository. In addition to the diagram definition, the diagram file also contains interface information similar to the interface files generated for primitive components.

The graphical connections 528 of FIG. 9 between components used in system diagram 136 represent instances of data or interface objects. The user also creates a diagram data file 137a associated with the system diagram file that indicates data storage allocation and initial values for the data object instances specified in the diagram 136. For instance, the data file might indicate that a 3-by-1 floating-point matrix is required to hold the data indicated by a line marked "ToolOffset", and that the initial values should be [4.0, 2.7, 0.0]. The user also creates a diagram documentation file 137b that provides documentation for the diagram. In one embodiment, it is a human-readable HTML file that has user notes.

For example, FIG. 15 illustrates the interface for a trajectory generator. In a preferred embodiment, this interface (and the trajectory generator itself) is represented as graphical icon 204 of FIG. 14 in which a solid line represents a data value of the component and in which circles or "bubbles" attached to lines represent methods of a component. In one convention, an incoming arrow attached to a bubble represents graphically a method that a component provides, while a bubble with an outgoing arrow represents graphically a method that a component uses. In this fashion, a domain engineer may quickly and easily connect components in a graphical manner. For example, output pins of one data flow component are connected graphically to input pins of another data flow component. Also, methods that a component calls are connected graphically via a line to a corresponding component that provides that particular method. As shown in the simple example of FIG. 14, a variety of components may be connected graphically to produce a composite object group 260. In a hierarchical fashion, composite object groups may be linked together to form a larger diagram and the final system diagram 136 is referred to as the top-level composite object group.

Preferably, there is a diagram file created for each state machine component and for each COG of system diagram 136. Each of these diagram files is a text file that has a list of the components included in the diagram, a list of the connections between the components and an indication of which connections are connected to each component. In general, each diagram file represents textually the graphical representation of one level in the design hierarchy. Alternatively, a diagram file need not be a text file, but can be of any format.

For a COG, its diagram file indicates which components are connected to which others. Using FIG. 14 as an example, the diagram file for COG 260 would indicate that state machine 202, trajectory generator 204, and PD controller 206 are connected to one another as shown. Likewise, a diagram file for a state machine component also indicates how its internal components are connected together. For example, in FIG. 14, the diagram file for state machine 202 would indicate that the "Pickup" stimulus received while in state "Idle" 220 executes the "Look" transition routine and make the state "Look for Item" 222.

Based upon this graphical creation of a final system diagram 136 using lower level components, the various diagram files and system diagram file 137 are loaded into repository 135. Files 137a and 137b are also loaded. Once system diagram 136 has been created and the diagram files have been loaded into repository 135, the intelligent control system is ready to be loaded into real-time computer 64 to begin execution of the real-time application. Such loading and execution will be described in greater detail in FIGS. 18-23.

Repository

Figure 11B:
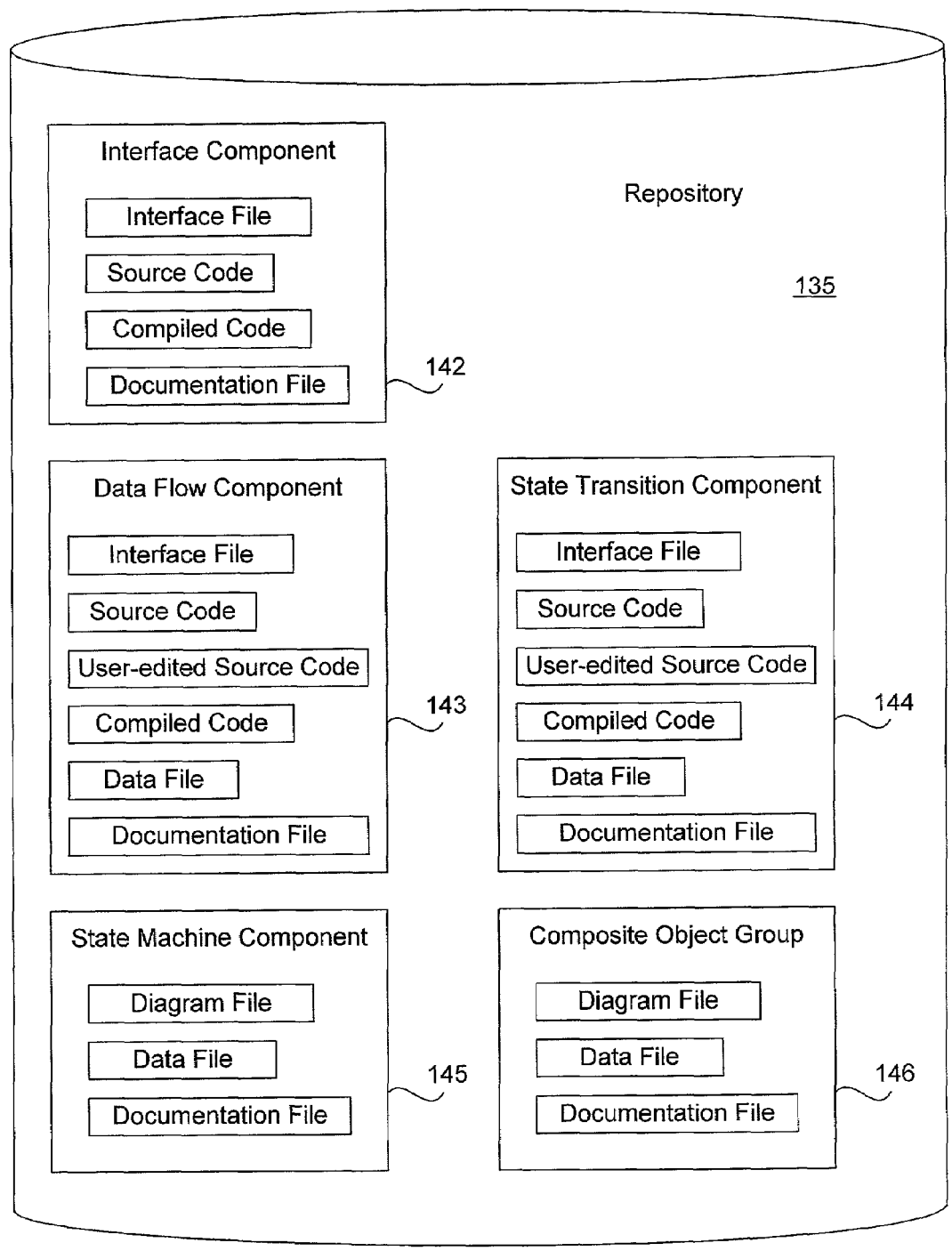
FIG. 11B illustrates in greater detail an embodiment for a repository.

FIG. 11B illustrates in greater detail an embodiment for repository 135. Repository 135 may be implemented in any suitable database or directory structure and preferably stores all components available to a domain engineer for creating a system diagram 136. Components may have arrived in repository 135 by way of interface definition tool 131 or they may have been predefined and supplied by a vendor or third party. In one embodiment of the invention, repository 135 includes interface components 142, data flow components 143, state transition components 144, state machine components 145, and composite object groups 146. In actuality, repository 135 may contain any number of data flow components (for example) that have different names and functions. For example, FIG. 14 illustrates two data flow components, namely trajectory generator 204 and PD controller 206, each of which may be present within repository 135. In a similar fashion, different types of the other components may also be present within the repository.

Interface component 142 includes an interface file 134 defined using tool 131, a source code file 132 produced by the code generator in block 130, and a compiled object file 133 available from block 130. A documentation file 139a is also provided from the documentation generator in block 130 that contains user notes regarding the component.

Each data flow component 143 includes an interface file 134 defined using tool 131, a source code file 132 produced by the code generator in block 130, a user-edited source code file 139 also available from block 130, and a compiled object file 133 available from block 130. A documentation file 139a is also provided from the documentation generator in block 130.

Each state transition component 144 includes similar types of files as component 143 although the files of course will be different. Each state machine component 145 includes a diagram file 137 created by tool 10 from system diagram 136, and data 137a and documentation 137b files. In a similar fashion, each composite object group within repository 135 includes a diagram file and data and documentation files.

Methodology

FIG. 12 illustrates a methodology 150 for creating a robot control system. As previously mentioned, COGs are components built from state machine components and data flow diagrams and are used in the creation of control system using object-oriented techniques. As shown, this methodology supports top-down object decomposition from right to left, and bottom-up component-based synthesis from left to right. The system will be explained from left to right, although design may occur in any order.

In this example, data flow component Trajectory 152 is a part of data flow diagram Arm Control 154 which is used to implement a portion of the sampled-data processing needed for the robot system. State transition component Open Gripper 156 is used as part of state machine Grasp 158 to perform the action of opening the gripper on the arm. An interface component Arm Command 160 has been defined to provide an interface to COG 162 that represents the robot arm. Components 154 and 158 are also included within COG 162 to provide both sampled-data processing and event-driven processing.

COG 162 representing the robot arm is itself a part of module 164 (which itself is also a COG) representing the overall robot that also includes other COGs representing other portions of the robot. In turn, robot 164 is part of a greater system, namely work cell 165. Work cell 165 also includes a vision module 166 and a graphical user interface module 167 to complete the overall system. Modules 166 and 167 are also COGs, as is cell 165.

FIG. 13 illustrates a methodology 170 for creating an aerospace system 170. The following description progresses from right to left in a top-down fashion although design may occur using a combination of top-down and bottom-up design. System 172 includes a graphical user interface 174, an Orbital Maneuvering System (OMS) 176 and a pressurization control system known as the Forward Reaction Control System (FRCS) 178. System 172 and elements 174-178 are preferably all implemented as COGs.

FRCS module 178 includes numerous COGs that are interconnected and enable FRCS 178 to perform its function. FRCS 178 includes by way of example a COG tank 180 that represents a tank within the system. An interface component 182 has been defined to represent the interface between tank 180 and the other COGs within FRCS 178. Tank 180 includes a data flow diagram 184 that represents the tank fill control, and a state machine 186 that represents the pressure sequencer of the tank. Tank fill control diagram 184 includes a data flow component filter 188 that is used to implement the data flow. Pressure sequencer 186 includes state transition component Open Valve 190 that performs the function of opening a valve when a transition is made from one state to another.

Thus, a methodology has been briefly presented that provides opportunity for both bottom-up and top-down design. Working from left to right utilizes functional programming in a bottom-up design. Working from right to left uses object-oriented concepts in a top-down design. Advantageously, the present invention supports both concepts. In practice, the design process for a control system is an iterative application of both approaches. Advantageously, COG 162 and COG 180 both support sampled-data processing through use of data flow components and diagrams, as well as event-driven processing through the use of state machines and state transition components.

Robot Arm Controller Example

FIG. 14 illustrates a very simplistic robot arm controller 200 that provides a simple example of a composite object group (COG) and of various interfaces. Details are also shown in FIGS. 6A, 6B and 6C. In this simplistic example, robot arm controller 200 controls a robot arm which is directed to look for an item, move its arm to the item, and then grasp the item. Robot arm controller 200 includes state machine 202 that determines the state of the robot arm, a trajectory generator data flow component 204 that generates a desired trajectory for the robot arm, and a PD controller data flow component 206 that provides control to a motor driver circuit 208 that moves the arm. Sensors 210 include any type of vision or similar sensors for determining the position of the robot arm and delivering an actual position signal 212 to PD controller 206. In this simple example, the value X(actual) 212 is a simple matrix that represents the X and Y position of the robot arm.

State machine 202 has three states. State 220 is an idle state in which the robot arm is not moving. When a Pick-up command is received, the state machine moves to state 222 in which it looks for the item to pick up. During this transition, the state transition component Look is executed that directs a vision system to look for the item. This direction is implemented as a method call through the method connection 236 to the Vision Look method 237 of sensors 210. If the item is not found, then the state machine returns to idle state 220. No action is executed during this transition. If the item is found, however, a Found event occurs and a transition to Moving state 224 occurs. During this transition, the state machine calls a state transition component named Set Goal. In turn, the On Execute method of this component executes and calls the Set Goal method 227 of component 204 through method connection 226. Once the state machine receives the Done event, it enters idle state 220.

Set Goal method 226 is a method provided by trajectory generator 204 that is called by the state transition component associated with the transition from state 222 to 224. The Set Goal method takes as a single parameter the value X(new) which is the new location to which the robot arm should move to pick up the item. Done method 232 is a method called by trajectory generator 204 that is implemented by state machine 202 and causes the Done event to occur.

Trajectory generator 204 receives the request to implement the Set Goal method and calculates a trajectory of points to move the robot arm from its current location to the X(new) location. For each sample period in the system (i.e., each cycle), the trajectory generator outputs a value X(desired) which is a single one of the trajectory of points. In this fashion, the trajectory generator incrementally moves the robot arm from point-to-point to gradually move it to the location X(new).

PD controller 206 receives input value X(desired) 230 and input value X(actual) 212, and gain 240. Gain 240 is a reference value that is more or less constant. PD controller 206 calculates a control signal 250 by multiplying the gain by the difference between X(desired) and X(actual). Control signal 250 is delivered to motor driver circuit 208 which moves the robot arm an appropriate amount. After a series of incremental movements based upon a trajectory of points output from trajectory generator 204, the robot arm will have moved from its original location to the location X(new).

In a more abstract sense, state machine 202, trajectory generator 204, and PD controller 206 may be thought of as a more general intelligent controller 260 that is capable of controlling the motion of virtually anything based upon input from sensors 210. In this sense, intelligent controller 260 is a composite object group (COG) as it forms a higher lever intelligent controller made up of the components 202, 204 and 206.

FIG. 15 is a textual representation of an interface 260 for trajectory generator 204. As shown, interface 260 indicates that the trajectory generator provides the Set Goal method, uses the Done method, and has an output pin X(desired). FIG. 16 is a textual representation of an interface 270 for PD controller 206. As shown, interface 270 indicates that the PD controller neither provides nor uses methods, but includes a variety of pins. Included are input pins X(desired) and X(actual), reference pin Gain, and output pin Control. FIG. 17 is a textual representation of an interface 280 for intelligent controller COG 260. As shown, interface 280 indicates that COG 260 provides the Pick Up method, uses the Do Look method 235 and includes various pins. Included are an input pin X(actual), reference pin Gain, and an output pin Control.

Mapping

Many system resources are mapped throughout a hierarchical system. The invention includes techniques for mapping system resources through the hierarchy of COGs. The techniques are presented in terms of the COG structure, but are applicable to any hierarchical composition of executable programs. The present invention provides the ability to map the modes of a system (i.e., choose which components of system will run in which mode), to map to an executable image (i.e., choose which components will be part of which executable image), and to map to threads of a processor (i.e., choose on which threads which components will run).

Mode Mapping

Most complex systems require different operating modes. Each operating mode can be represented in a system diagram 136 as a list of active components. An active primitive component will execute when it is normally scheduled. An inactive component skips its execution, and is thus turned "off". Thus, modes advantageously allow the system to select sets of components to execute under user or program control.

Prior art "Simulink" from The Mathworks of Natick Mass. and "SystemBuild" of Integrated Systems Inc. of Sunnyvale Calif. solve this problem with "enable" control signals that appear as lines on the diagram. When the block is to be enabled, the signal line is activated. This solution, however, results in a large number of control lines and "switch blocks" to manage them. It is difficult to understand which parts of the diagram will execute in different modes.

Furthermore, many complex systems often radically change modes of operation during execution. The designs of these systems may fail to consider the wide-ranging effects of these mode changes and "run out of steam" due to the complexity of the branches and switch blocks required. A fundamentally new approach would be desirable.

Figure 24:
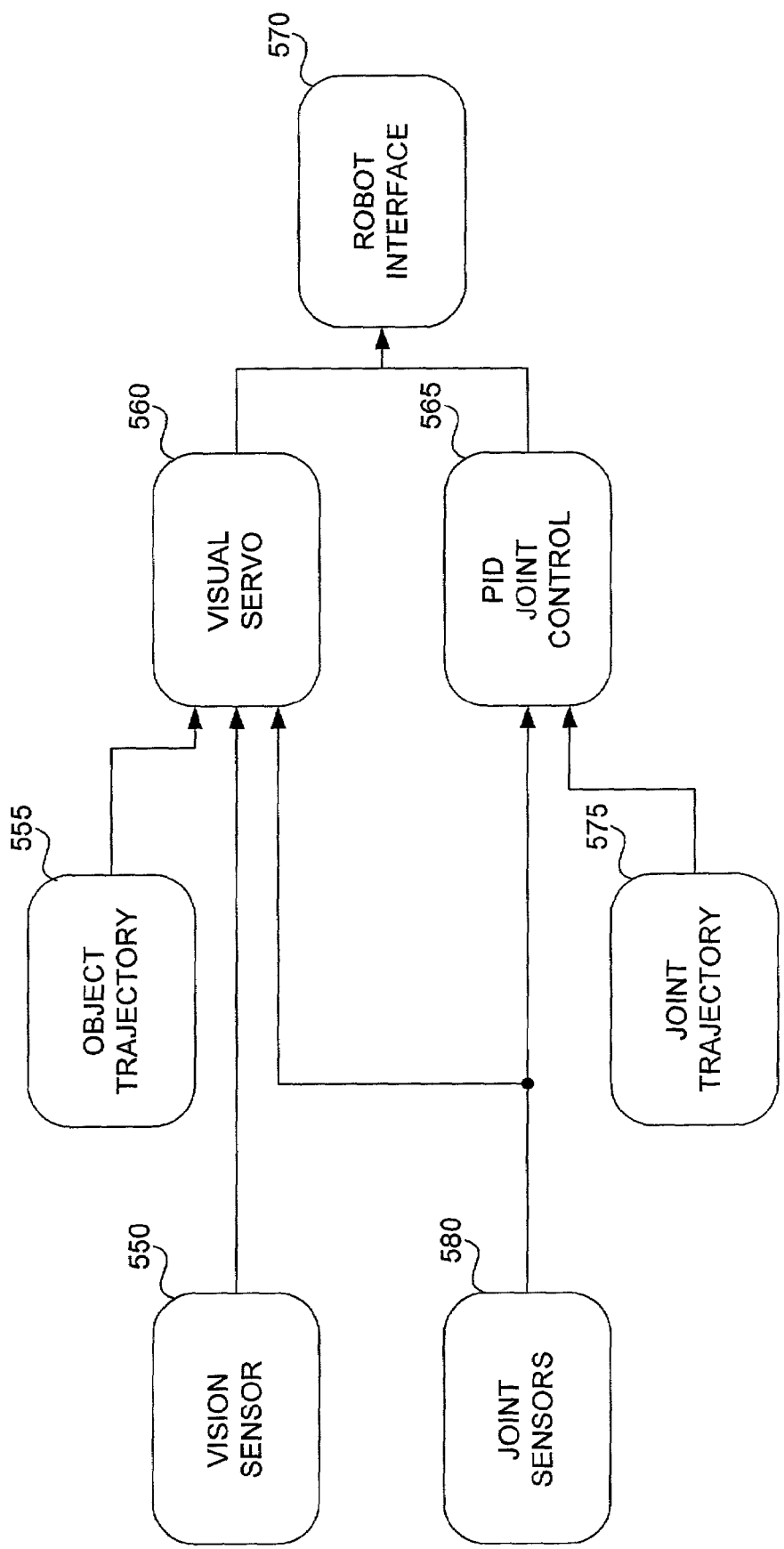
FIG. 24 illustrates a system of seven data flow components having two operating modes.

Advantageously, the current invention allows designers to define modes visually as shown in FIG. 24 by simply clicking on the components to be activated. The modes are displayed on development tool 10 by highlighting the active components. This makes modal operation much easier to understand. In general, a mode corresponds to a set of active components. By defining different modes, a real-time system can switch between different codes paths easily and quickly.

Mode switching may also be performed under the direction of the event-driven part of a COG, thus allowing the COG to react to events by changing operating modes automatically.

For instance, in FIG. 24, the system of seven data flow components may have two operating modes. The first mode may require the five components Joint Sensors 580, Vision Sensor 550, Object Trajectory 555, Visual Servo 560, and Robot Interface 570, and allows the system to follow objects based on vision input. The second mode may require Joint Sensors 580, Joint Trajectory 575, PID Joint Control 565 and Robot Interface 550, and lets the system move to arbitrary joint positions. These modes are advantageously displayed for easy understanding in development tool 10.

Moreover, the modes are then given names, and referred to by name. This advantageously provides a level of abstraction between the mode definition and mode selection, insulating higher-level programs from implementation details. For instance, the above modes may be named "Vision Control" and "Joint Control".

Figure 25:
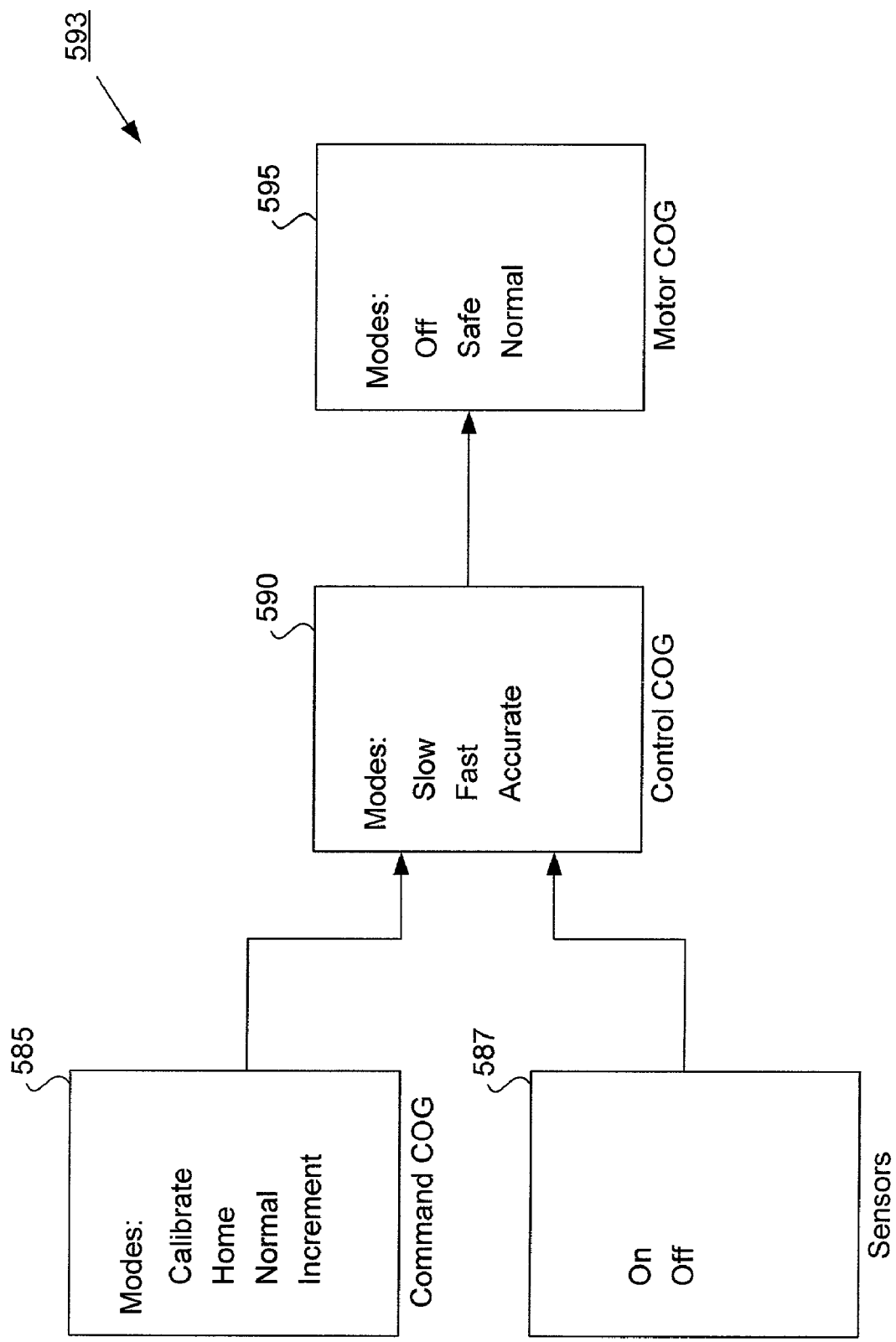
FIG. 25 illustrates a system of COGs each having various modes.

The present invention advantageously allows users to define modes of complex systems by selecting a mode for each sub-system by name. Thus for example, in FIG. 25, an overall system mode for COG 593 may be defined by choosing a mode from Command COG 585 (one of "Calibrate", "Home", "Normal", or "Increment"), a mode from Control COG 590 (from "Slow", "Fast", or "Accurate"), and a mode from Motor COG (from "Off", "Safe", or "Normal"). Sensors 587 are any suitable sensors that may be either on or off. System modes could be defined for COG 593 such as:

| Mode | Command | Control | Motor |
| --- | --- | --- | --- |
| Startup | Calibrate | Slow | Safe |
| LargeMotion | Normal | Fast | Normal |
| FineMotion | Increment | Accurate | Normal |
| Safe | Home | Slow | Safe |
| Test | Normal | Fast | Off |

With these modes, the system can easily be used to start motions, slew, perform fine operations, and more. Each change switches many components deep in the hierarchy, but it is presented as an intuitive, named change at the top level.

In one embodiment, modes for subsystems are selected by choosing from a list presented when clicking on the icon representing the subsystem. Of course, there are many possible means of selecting named modes. In one embodiment, a mode menu is available for the application component (highest level) or a COG. The menu contains commands to activate and display the modes defined for that component. The activate command activates a mode once the name of the mode is specified. The display command displays graphically (or textually) the implementation of that mode, i.e., those components that are active for that mode. The user is thus able to easily see and initiate modes. In one embodiment, the interface file (".cog" file) for each COG keeps track of which of its included components are associated with which modes defined upon the COG. Other tracking mechanisms are also possible.

Modes may be defined differently for different types of components. For example, it is mentioned above that a given set of components may be active for a certain named mode. For a COG, then, a certain named mode of that COG indicates which components within it will be active, or will be "running" in that named mode. Because a COG may have many modes defined, a COG does not have a simple "on" mode. A COG, however, does have one mode that is the default mode. The default mode may be assigned to any mode. If not, the default mode of a COG means that all contained DFCs and FSMs are "on", and that each contained COG is in its default mode. For the simple, primitive components such as atomic components, data flow components, and state transition components, each has simply either an "on" or an "off" mode.

In general, each operating mode is represented in a diagram as a list of active data flow (DFC), COG and FSM components. An active or "on" DFC or COG means that it will run at every sample period; an active FSM means that it is processing stimuli. "Off" for a DFC or COG means that that it will not run anything at each sample period. An FSM that is "off" will not process any stimuli. The tool allows a user to change modes—the list of active components—at run-time without shutting down the application. Activating a mode of a COG activates all the components of the COG that are part of that mode, while also causing the other components in the COG to be deactivated.

In one specific embodiment of the invention, each mode is represented by an object. I.e., an object is instantiated that corresponds to a certain mode. This mode object encapsulates a variety of information including the knowledge of which contained components are part of the mode. For example, if a given COG has two modes, each is represented by an object and each keeps track of which internal COG, state machine, data flow component, etc. belong to that mode. Further, each mode object has method "activate" that allows that mode to function to the exclusivity of the other modes. For example, once the "activate" method is called for a "calibrate" mode of a COG that also has a "run" mode, the method then functions to only activate those components that belong to the "calibrate" mode; the other components are not activated.

Switching between modes is also allowed. Each COG further has a method called "change mode" that takes as a parameter the mode to which the system should be switched. For example, should the user wish to switch the system from the "calibrate" mode to the "run" mode, the "change mode" method is called. The effect of the change mode method is to call the "activate" method for the "run" mode, and to deactivate those components that are associated with the "calibrate" mode. Modes may be changed (i.e., changing the list of active components) at run time without shutting down the application.

Thread and Habitat Mapping

Other system resources are also mapped through the hierarchy. In a data flow system, sets of components often run at different rates of operation. For instance, the controller and the motor output may have to run at 500 Hz (every 2 milliseconds), while the collision detection may only need to run at 2 Hz (twice a second). Of course, in a real system, hundreds of components may have to execute at specific rates. Scheduling these sets of components requires mapping components to operating system threads. As is known in the art, a thread is a process that runs on a processor. There may be more than one thread running on one processor.

The present invention provides a mechanism for mapping threads to components. Advantageously, the present invention defines an object called a "habitat" that encapsulates a thread and the list of components that are to run at a certain rate. Thus, assigning a component to a habitat object results in the component being assigned to a particular thread and rate. A habitat object represents an execution environment for a set of components. This environment includes the specification of thread priorities, sample rates, and even CPU identification in a multiprocessor system. Using multiple habitats allows for multi-rate systems and multi-threaded applications. Advantageously, the habitat object (including its rate) is defined at a high level and then mapped down through the hierarchy to individual components.

Data flow systems (data flow components and COGs) associated with the same habitat run at the same sample rate using a single thread of execution. All finite state machines (FSMs) associated with the same habitat execute in a single thread, but each maintains a separate logical event queue for stimuli. In addition, each FSM is allowed access to operating-system level resources through its habitat. These resources include: a thread of control that runs the FSM engine; a message queue that holds incoming stimuli; and a periodic timer for checking numeric stimuli. Within a single application, multiple FSMs may share the same habitat, thereby allowing a single thread to manage multiple independent state machines.

At the top level of a system diagram, a user defines one or more actual physical habitats (or "local" habitats) that corresponds to actual run-time operating-system threads that are available for the entire application. The user also assigns actual parameters—priorities, rates, CPU, etc.—to these local habitats. At lower levels of the hierarchy of components—within COGs and FSMs—the user defines logical habitat placeholders known as "mapped" habitats. These include logical rates for each component. Then using a suitable user interface, the user maps these logical habitats (and logical rates) to actual physical habitats (and actual rates) at the highest level.

Advantageously, the present invention allows users to define these logical rates for components. A COG, or a data flow component, can utilize one or more logical rates. To map executable resources to the COG, the user assigns a habitat from the enclosing COG to each rate in each sub-COG or component. In this manner, the present invention advantageously allows fine control over how many threads are running in the system. In one embodiment, the interface file (".cog" file) for each COG keeps track of which of its included components are associated with which threads (including with which rates) assigned to the COG. Other tracking mechanisms are also possible.

In one embodiment, each local (or physical) habitat defines a pair of threads. One thread is for the sampled-data portion of the system, and the other for the event-driven portion. Parameters for the sampled-data portion of the habitat include sample rate, CPU, priority, stack size, task options, etc. Parameters for the event-driven portion of the habitat include FSM rate, CPU, priority, stack size, task options, queue capacity, etc. Each application or system has one local habitat, but several habitats may be present in multi-rate applications.

The process of mapping habitats (including rates) consists of defining a map at each hierarchical level of a system. The following discussion illustrates such mapping using only the rate parameter; mapping of other parameters and habitats may occur in a similar fashion. First, the actual rates available within a real-time system are defined at the highest level of the system (the top-level COG or "application" COG). Next, each component contained in this highest level has its logical rates mapped to the actual rates defined. Thus, for each DFC, COG and FSM, its defined logical rates are mapped (or assigned) to the actual rates available within the system. This procedure continues in a recursive manner. Thus, for each COG in the hierarchy, the logical rates of its contained components are mapped to the logical rates for the COG. More than one logical rate of a contained component may be bound to the same container rate, thus forcing components designed to be capable of running at different rates to run at a single rate. This situation may be required because of limited system resources. Finally, for a primitive data flow component, each sample rate is implemented with C++ code. For simple applications, each container component has a default logical rate; every component placed into the container is mapped to the containers default rate. Therefore, for simpler single-rate applications, rates need not be mapped explicitly in order to run the application.

Figure 26:
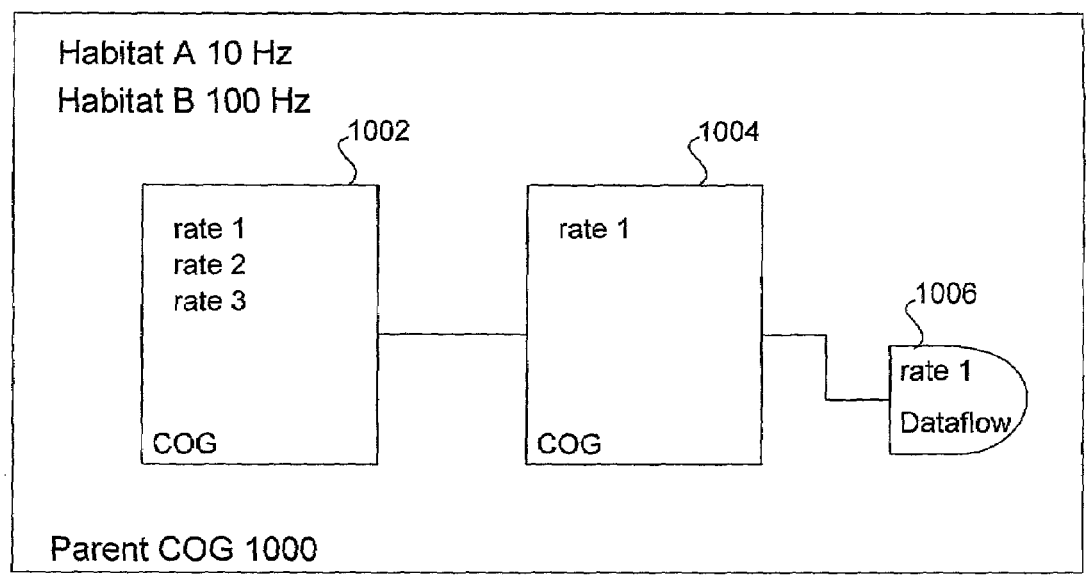
FIG. 26 illustrates mapping of threads in a simple one-level system having two rates of execution.

For example, in FIG. 26, ParentCOG 1000 (the top-level COG) contains three components: COG 1002, COG 1004, and a data flow component 1006. Cog 1002 utilizes three logical rates, called rate1, rate2, and rate3. Cog 1004 and Dataflow 1006 each support only one logical rate, rate1 as well. In one embodiment, the logical rate names of peer COGs (1002, 1004 and 1006) are not related implicitly, although such an implementation is possible. Parent COG 1000 defines two habitats A and B, each providing a 10 Hz rate and a 100 Hz rate, respectively. In other words, two possible threads of execution are represented by habitats A and B. The other parameters provided by these habitats are not shown.

Because there are three logical rates required overall, yet only two actual rates provided, two of the logical rates will have to double up. If there had been three habitats provided (presumably with different rates), each of rate1, rate2 and rate3 would be assigned to a different rate. To map the parent's actual habitat rates, "10 Hz" and "100 Hz" to its sub-COGs, the user simply assigns habitat to logical rates by name. For example, habitat A is assigned to rate1 and rate2, and habitat B is assigned to rate3. This assignment may be done graphically by clicking on the rates in each COG which provides a menu of choices (or alternatively by clicking on the habitats), or may be done manually by a programmer in code. Were any of components 1002 or 1004 to have sub-COGs or other components, the logical rates of these contained components would then in turn be assigned to the logical rates of COGs 1002 and 1004. Thus, the actual rates of 10 Hz and 100 Hz are mapped throughout the hierarchy.

Figure 27:
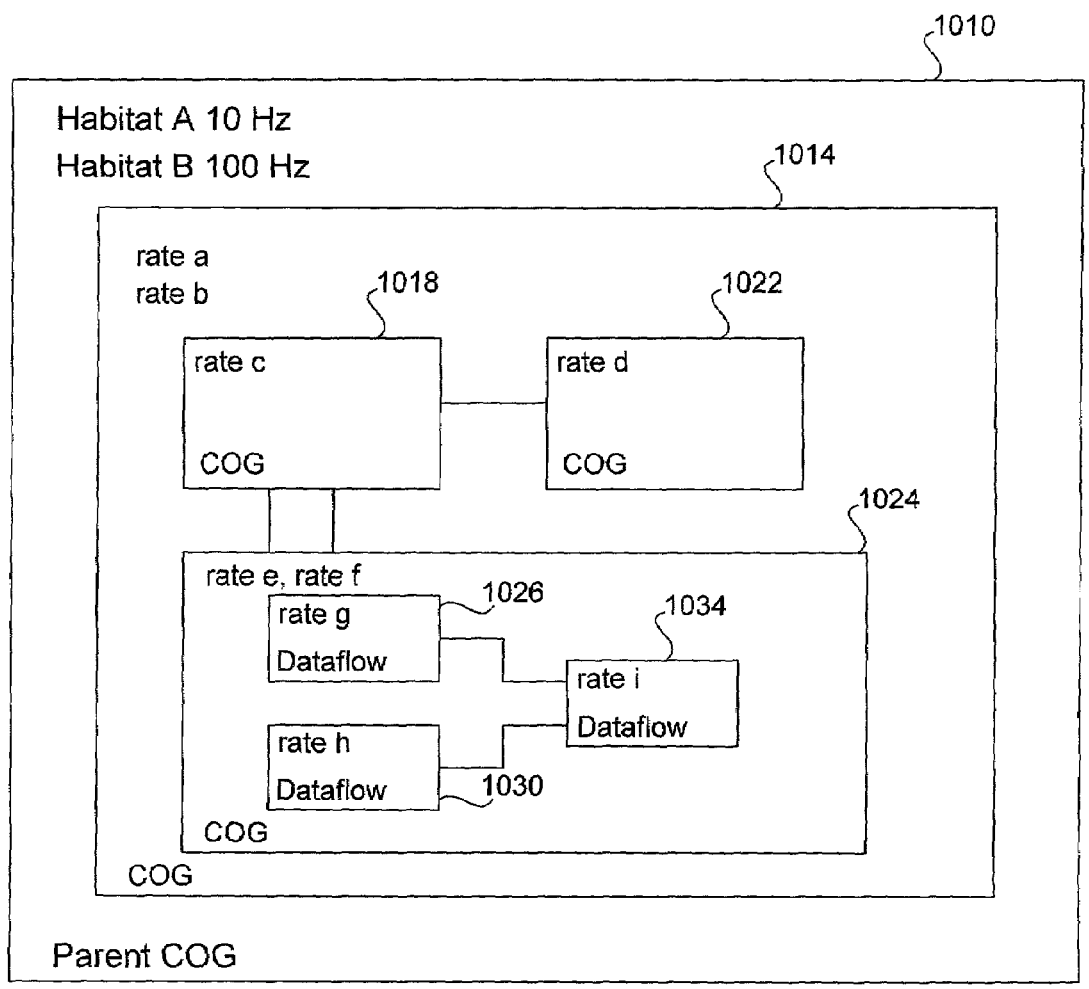
FIG. 27 illustrates mapping of threads in a more complex system having two rates of execution and a hierarchy or components.

FIG. 27 provides an example of such mapping. A top-level parent COG 1010 (alternatively called the "application") defines two habitats A and B having two actual rates of execution, 10 Hz and 100 Hz, respectively. Contained within parent COG 1010 is COG 1014 that defines two logical rates, rate a and rate b. Included therein is COG 1018 using rate c, COG 1022 using rate d, and COG 1024 using rate e and rate f. Included within COG 1024 are data flow components 1026, 1030 and 1034 using rate g, rate h and rate i, respectively.

Parent COG 1010 may have been constructed in a top-down fashion, a bottom-up fashion, or by using a combination of the two. At some point, the user will map rates either from top-down or from bottom-up. Considering the top-down approach, the user first maps rate a to habitat A (an actual rate of 10 Hz), and maps rate b to habitat B (an actual rate of 100 Hz). Next, rate c and rate d are both mapped to rate a. Within COG 1024, rate e is mapped to rate a, and rate f is mapped to rate b. Finally, rate g and rate i are mapped to rate e, while rate h is mapped to rate f. Of course, different mappings are possible. In this fashion, the actual rates of 10 Hz and 100 Hz are assigned to components throughout the hierarchy.

Executable Program Mapping

In a complex system, users sometimes wish to build multiple executable programs from a single diagram or set of diagrams. Advantageously, the present invention allows users to assign executable programs throughout the hierarchy. As with modes and habitats, executable assignment is by name. In general, from a single system diagram, the user may build different executable programs, each consisting of a different subset of components that make up the application for the desired executable. The process of selecting the subset of components involves defining an executable by name and hierarchical mappings through the system diagram, much like the mapping process for habitats and rates described above. The resulting executable contains only those components that are needed to implement that executable program.

Figure 28:
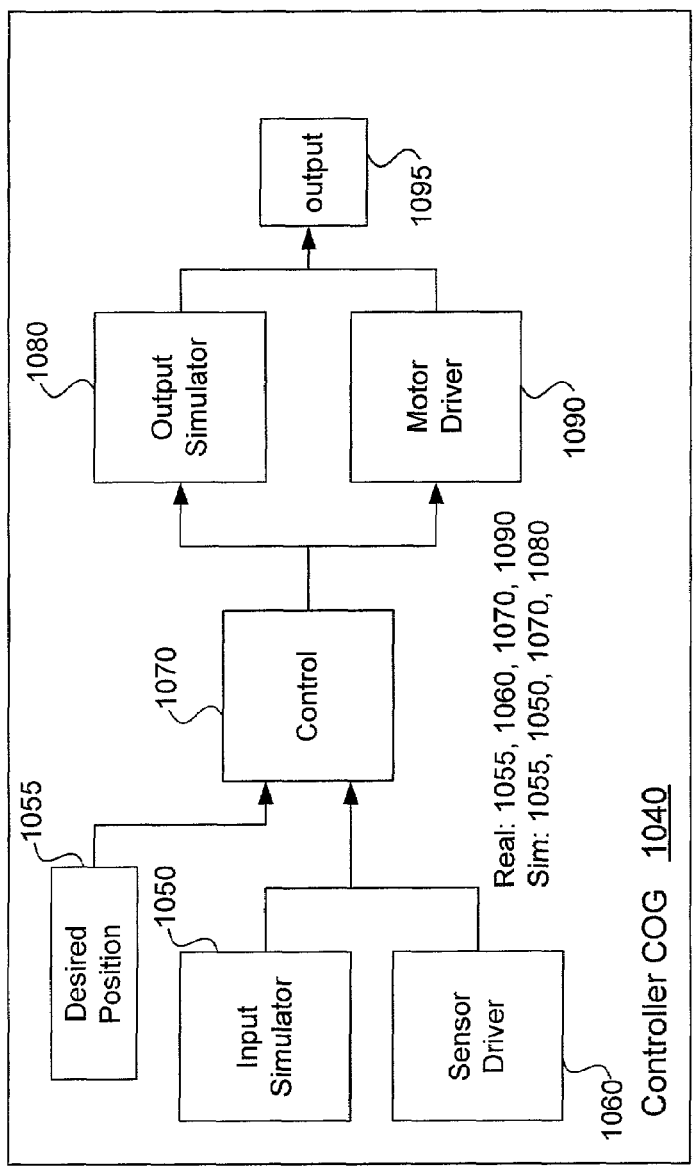
FIG. 28 illustrates mapping of components to executable programs.

For example, in FIG. 28, controller COG 1040 has two different possible implementations. Control component 1070 can be used with the actual hardware components SensorDriver 1060 and MotorDriver 1090, or with the simulated components InputSimulator 1050 and OutputSimulator 1080. Input value Desired Position 1055 is used in either implementation. These two implementations are built into different executable programs. For example, the actual hardware drivers may only exist on an embedded real-time system, while the user may wish to run the simulated version on his desktop workstation. The present invention allows the user to define a "hardware" executable for the actual hardware case, and a "simulated" executable for the simulation case.

To define these implementations, placeholder executable names are identified in COG 1040 and components are assigned to them. This assignment of components to executable names is similar to the way components are assigned to rates as described above. The mapping of executable may be accomplished in the same manner. In this simple example, components 1055, 1060, 1070 and 1090 are assigned to the formal parameter "real", indicating they are part of an executable for real hardware, and components 1055, 1050, 1070 and 1080 are assigned to the formal parameter "sim", indicating they are part of an executable for a simulation.

Figure 29:
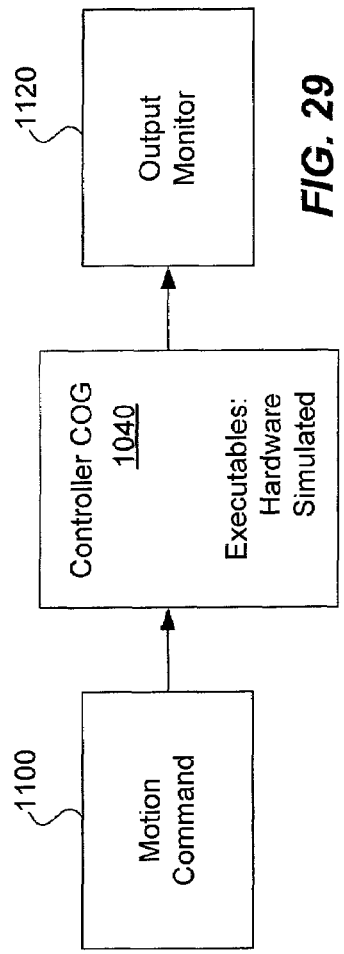
FIG. 29 illustrates an intelligent control system having two executable programs.

From the next level up shown in FIG. 29, these options appear as selections in the executable mapping for controller COG 1110. For example, COG 1040 defines two executables "hardware" and "software". They will run on actual hardware and a simulation computer, respectively. The formal parameter "real" and its assigned components are mapped to the "hardware" executable, while the formal parameter "sim" and its assigned components are mapped to the "simulation" executable. Of course, an executable can be mapped throughout a multi-level hierarchy of components in much the same way that rates are mapped. If the other components MotionCommand 1100 and Monitor 1120 are included in both executable programs, the system can advantageously generate both a hardware version with drivers or a simulation version with simulated hardware from a single diagram. The user is then freed from having to design different systems to produce different executable programs. A simple choice at a high level can produce the desired executable program.

In another example, consider a control system to be run in both a UNIX simulation world and on a real-time system. The user is able to define two different executable programs by name at a high level. Both executables will contain the same controller COGs, but the UNIX executable will include a set of component definitions that implements a simulation of the plant, while the real-time system will include a set of component definitions that contains the hardware device drivers. This technique maximizes the reuse of component definitions and guarantees that—in this example—the controller is the same for both systems.

Leveraging a single design into many executable programs provides two main benefits: concurrent operation and platform accommodation. Concurrent operation is provided because individual executable programs derived from one system diagram may execute simultaneously on different processors. Platform accommodation is provided because an executable may be defined for a specific set of hardware or architecture, allowing a single system diagram to generate executables than can run on otherwise incompatible platforms.

Platform accommodation allows simulating a design before implementing it. In this scenario, a system diagram would have two components for each hardware unit. One represents the hardware device driver; the other simulates the hardware. Thus, the simulation executable contains the simulation components; the implementation executable contains the hardware components. Both executables contain the hardware-independent components, thus ensuring that the simulated and implementation executables mirror each other as closely as possible.

A typical use is to define executables for multiple target platforms. For example, an executable called "host" might be created, and another one called "vx" that correspond to applications that will run on a host-development platform (UNIX or Windows NT) or VxWorks, respectively. All relevant components of the system diagram are mapped to each executable. Each executable, however, includes a different platform-dependent clock. For instance, the vx system includes an auxiliary clock component, while the host system includes a default clock component.

In one embodiment of the invention, mapping of executables may proceed as follows. With respect to FIG. 28, first the formal parameters names "real" and "sim" are created to serve as placeholders for two different types of executables. Next, components are assigned to each parameter either by clicking on a component and naming the parameter to which it is assigned, or by starting from a parameter name, and then choosing included components by searching through a directory. Internally, tool 10 makes a notation in the system diagram file indicating that a particular COG or component is to be included with a particular type of executable. Alternatively, in another embodiment, the interface file (".cog" file) for each COG keeps track of which of its included components are associated with which executables defined upon the COG. Finally, once COG 1040 is complete and implemented as part of FIG. 29, the user defines two executables "hardware" and "simulated" to which are mapped "real" and "sim", respectively. When it come time to run an application, an image is built for either the "hardware" or "simulated" executable and it is loaded onto the appropriate computer.

In a variation on this embodiment, tool 10 provides for each COG (including the top-level) two predefined flags named "Included" and "Excluded." The Included flag for a COG means that the COG itself and all components within its hierarchy are included within the executable for its container COG. This results in the top-level Included flag including all components in the entire system diagram—all the way down the containment hierarchy. The Excluded flag for a COG means that the COG itself and all components within its hierarchy are excluded from the executable for its container COG. For example, control COG 1070 of FIG. 28 may be flagged Included to indicate that it forms a part of any executable for Controller COG 1040.

Detailed Flowcharts for System Creation and Execution

Overall System Creation

Figure 18:
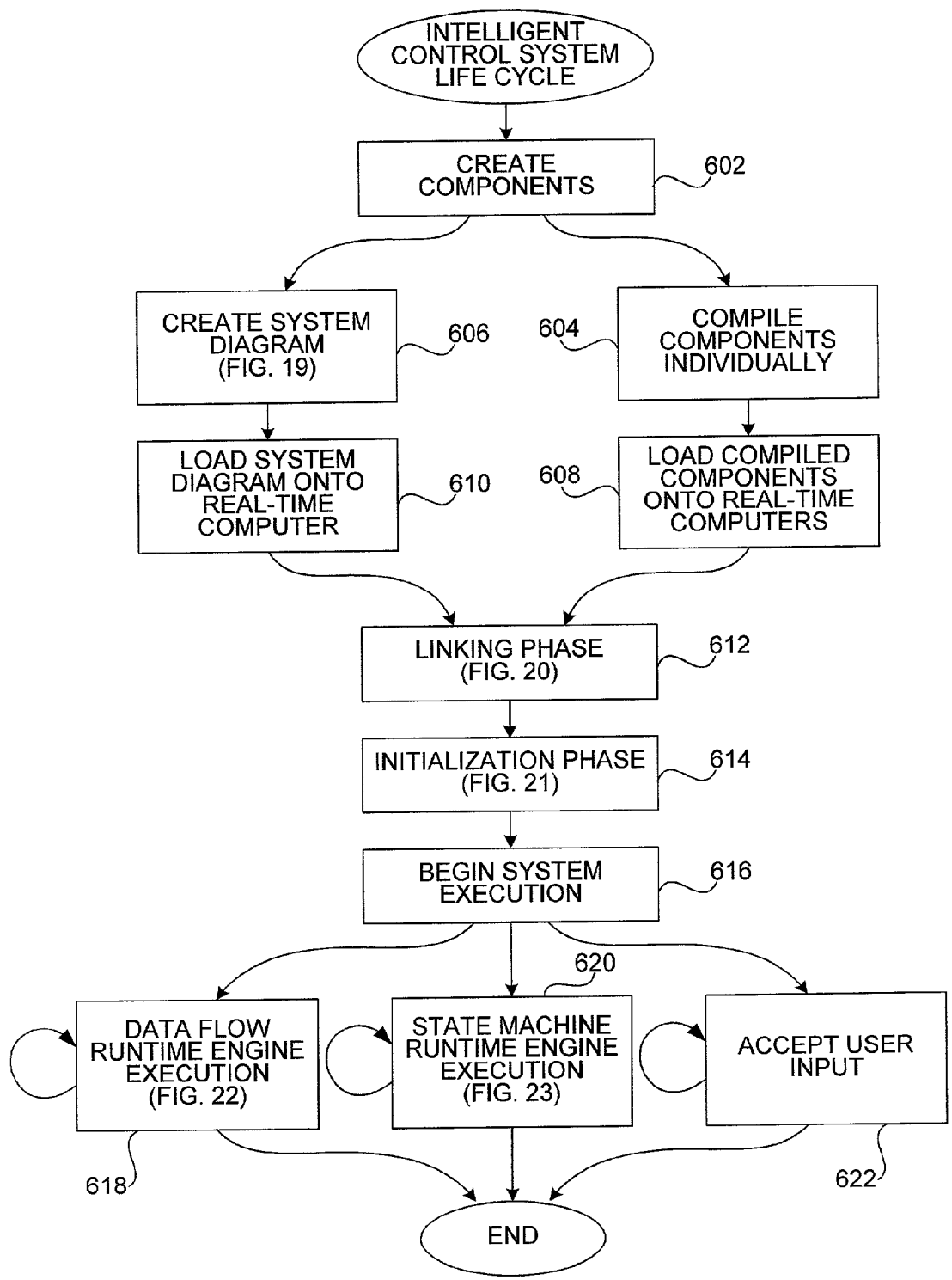
FIG. 18 is a flowchart describing one embodiment of the life cycle for an intelligent control system.

FIG. 18 is a flowchart describing one embodiment of the life cycle for an intelligent control system. Of course, there are other aspects to the life cycle of a control system such as initial design, iteration, testing, maintenance, etc., although these aspects are not shown in this flowchart. In step 602, components needed for the implementation of the system are created. These components include any of the components previously discussed herein. These components may be created by a vendor, a third party, or by a programmer who is building the control system. Of course, creation of components may take place in advance of the actual building of the system, or may take place in parallel with step 606 as the system is being created and a need for a particular component is realized. In this sense, bottom-up design (i.e., creation of components) may alternate with top-down design (high level block specification). In a preferred embodiment of the invention, creation of individual components occurs as described in FIGS. 10, 11A and 11B and the components created include those illustrated in FIGS. 4-9 and discussed herein. Other variations on these components and other types may also be created.

In step 604 each created component and its interface is compiled individually and the results are stored in repository 135. Step 604 may be performed as previously described in blocks 131-133 of FIG. 11A. In particular, the components compiled are atomic, interface, data flow and state transition components, and the result of step 604 is a source code file, a user-edited source code file, a documentation and a compiled code file for each component. Step 604 may take place all at once, or a compilation of components may occur mixed in with step 606 as a programmer creates a system.

In step 606 a domain engineer creates a high level system diagram 136 using a graphical user interface of development tool 10 as has been briefly described previously in FIGS. 2 and 9-14. A preferred embodiment for step 606 is presented in greater detail below in FIG. 19, although the creation of a system may take many forms. The result of step 606 is a system diagram 136, diagram files 137 and a data file for each state machine component and composite object group (COG) created during the process.

Once a system diagram 136 has been created, in step 608 the compiled components are loaded onto the real-time computer. In one embodiment, the compiled code (or object) files for each atomic, interface, data flow and state transition component are loaded from repository 135 onto real-time computer 64. These compiled code files provide executable code for each of these components. The individual component objects have been linked together with a typical link editor phase of a compiler to resolve symbols. However, data and method links between these components specified by the diagrams have yet to be completed. Links between components are provided in the diagram files for each state machine and COG defined during step 606. Step 610 loads these diagram files from repository 135 onto real-time computer 64. Linking phase 612 connects components in accordance with the diagram files. This phase will be discussed in greater detail below in FIG. 20.

Initialization phase 614 provides initialization for data flow and state machine components and is described below in FIG. 21. In step 616 the user of the system initiates system execution so that the system may begin performing the control application for which it has been designed.

During system execution, numerous processes may be running concurrently. In a preferred embodiment of the invention, one or more data flow run-time engines 618, along with one or more state machine run-time engines 620 are executing in parallel in order to provide sampled-data processing and event-driven processing, respectively, for the control system. These engines are discussed in greater detail below in FIGS. 22 and 23. Concurrently, the control system may accept user input 622, which may dictate a change in the course of action for the system. This user input includes starting and stopping the engines, status monitoring, changing parameters, etc.

Creating System Diagrams

Figure 19:
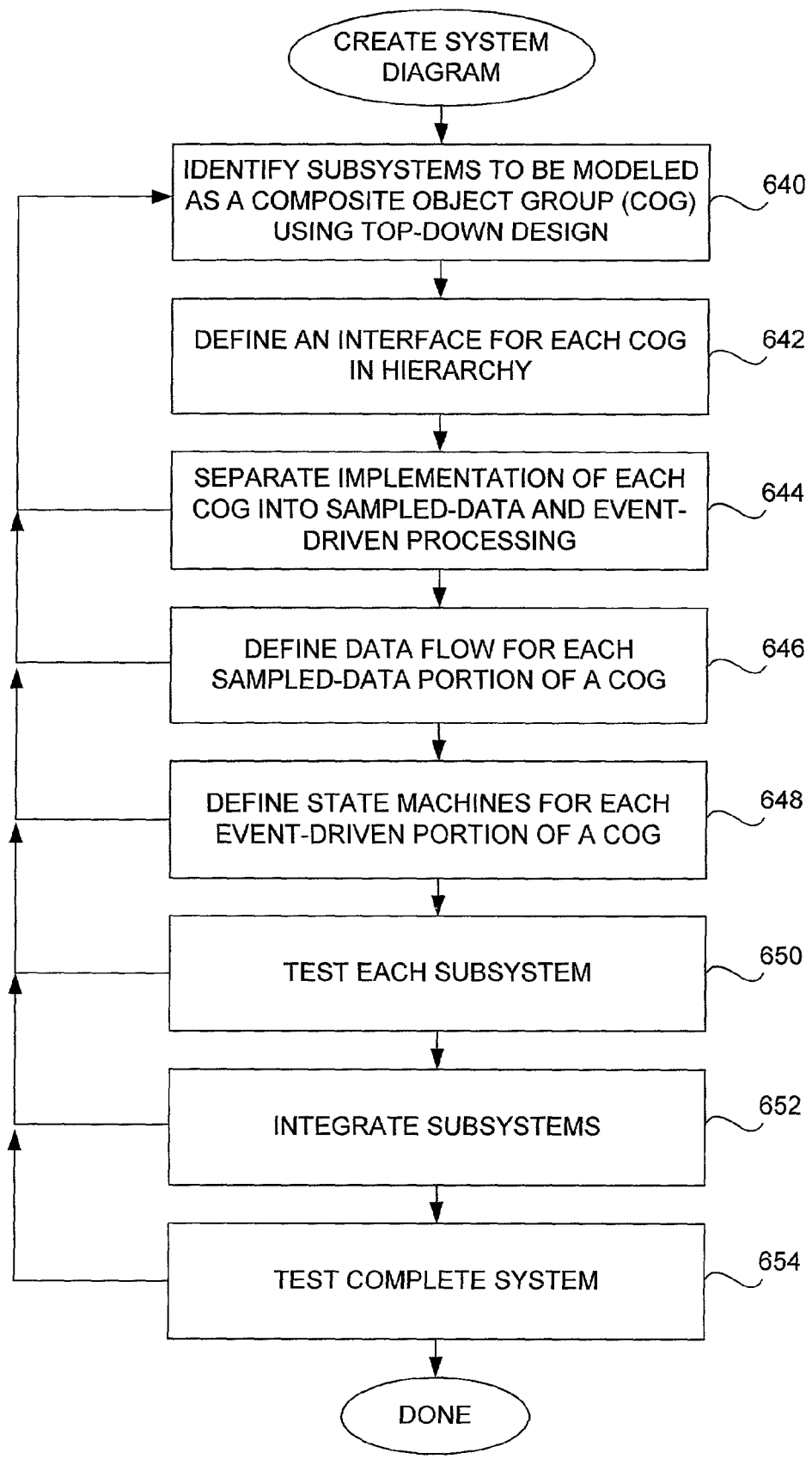
FIG. 19 is a flowchart describing one embodiment for the create system diagram step 606 of FIG. 18.

FIG. 19 is a flowchart describing one embodiment for the create-system-diagram step 606 of FIG. 18. It will be appreciated by those skilled in the art that the design, implementation and test of an intelligent control system may be performed in a wide variety of manners. By way of example, FIG. 19 presents one suitable design methodology that works well with the present invention, although other design methodologies may work well also. Advantageously, this design methodology uses a combination of top-down and bottom-up design using component object groups (COGs) and components to provide a fast and intuitive system design. The entire process of creating a system diagram is iterative and the steps shown are not necessarily performed in sequential order. In fact, it is most likely that steps may be performed in combination as the domain engineer goes back and forth between top-down and bottom-up design.

Defining COGs

In step 640 top-down design is used to identify subsystems within the control system that will be modeled as composite object groups (COGs). This step typically creates a hierarchy of COGs through a top-down decomposition of the system into logical object models. Advantageously, it is easiest to map each logical object model to a physical object or a set of physical objects in the system: a power subsystem, a chemical handling subsystem, a vacuum subsystem, a work cell, a robot, etc. An object model can also model software: a user interface, a motion planner, etc. Each logical object model is then decomposed further into smaller objects: a power supply, a gas flow regulator, a pump, a robot joint, a collision avoidance algorithm, etc.

Once a hierarchy of logical object models has been created, a COG is created to represent each of the object models. Preferably, this is done graphically using development tool 10 in which an icon represents a COG. A top-level COG is created to represent the final control system. New COGs are then created for each of the lower level object models and these are inserted into the top-level COG. Creation of COGs as placeholders for each object model continues in this hierarchical fashion until the lowest level is reached. COGs may be created in this step merely as placeholders and do not need any implementation details at this point. Further down the hierarchy of COGs, it may be possible to use an existing COG or component from the repository 135. Components are also reused at lower levels during bottom-up implementation. Examples of a top-down design combined with bottom-up implementation using a hierarchy of COGs are shown in FIGS. 12 and 13.

COG Interfaces

In step 642, an interface is defined for each COG in the hierarchy created. Examples of an interface for a COG are shown in FIGS. 9 and 17. Although an interface for a COG may be defined using code, is it preferable to define the interface graphically. During this step, the domain engineer analyzes what data and data types will be needed by the COG and defines appropriate input pins for the COG. Data to be produced by the COG is identified and corresponding output pins are defined for the COG. Additionally, any reference data needed or used for the COG is identified and a reference pin is defined upon the COG for each such reference data value. The domain engineer also analyzes each COG to determine which methods (or commands) will be provided (or supported) by the COG. For each such method provided by the COG, the engineer defines a name for each such method and provides a graphical notation on the COG indicating that it is a method that the COG provides. In a similar fashion, the engineer determines which methods or functionality each COG will need to access in other components. The engineer then defines a method name upon the COG corresponding to a method that the COG will need to call. This allows the COG to issue commands to other components.

As interfaces for COGs are defined, the role of each COG within the system as well as its capabilities in functionality become more refined. Step 642 is iterative in that COGs throughout the hierarchy may need to be revisited and their interfaces redefined. During this step it is possible not to make connections between COGs. Connections between COGs can made at any time. When a connection is made on the graphical diagram 136, it is entered into the COG diagram file 137. The diagram file has a list of graphical interconnections 528. During the linking phase 680, the run-time engine loads the diagram file, reads the list of interconnections, and performs the connections from pins and bubbles in the COG object to data objects, as described below with reference to FIG. 20.

Using Reusable Interface Components

As an optional step, the domain engineer and/or interface programmer determine if the system design will benefit by grouping often used data and commands into a reusable interface component. Creation of an interface component is discussed above with reference to FIG. 8. As another option, the domain engineer may wish to identify data types and/or create needed data types to encapsulate a set of data or to guarantee type safety. Use of data types is a tradeoff between type safety and reusability and is an implementation detail appreciated by those of skill in the art.

Dividing into Data Flow and State Machines

Step 644 begins the implementation phase of development and is often referred to as bottom-up design. Because the entire creation of a system diagram is iterative, this step may very well begin before the entire object model hierarchy had been determined in step 640. Furthermore, the beginning of this implementation phase may in turn cause additional hierarchies to be exposed, thus triggering further top-down design beginning again in step 640.

In step 644 each COG is divided conceptually into sampled-data and event-driven processing portions, although there may not necessarily both be present for a given COG. For example, higher level COGs tend to be more event-driven as they respond only to commands and rare events. These COGs may not have a sampled-data portion. Lower level COGs, however, often perform more sampled-data processing as they continually monitor, filter, control, or otherwise process physical systems. These COGs may not necessarily include an event-driven processing portion. Other COGs may very well have a combination of both sampled-data and event-driven processing portions.

Once each COG has been separated conceptually into sampled-data and event-driven processing portions, each of these portions is then implemented using components provided by the present invention.

Data Flow

Step 646 defines data flow and produces a data flow diagram for the sampled-data portion of a COG. To build a data flow diagram for a COG the domain engineer preferably looks for COGs and/or data flow components in the repository that already perform pieces of the processing need. If necessary, new COGs and/or data flow components are created at this time to provide functionality required. Next, the reused and newly-defined COGs and data flow components are connected graphically to perform the processing required. As each control application is unique, the creation of a suitable data flow diagram is dependent on each situation. Those skilled in the art will appreciate how to connect input and output pins of COGs and data flow components to process data within the particular COG. A simple example of a data flow diagram is shown in FIG. 14 in which data flow components 204 and 206 accept inputs, process data, and finally produce an output control signal 250 for controlling an application. Of course, much more complex data flow diagrams are possible.

State Machines

In step 648, the event-driven processing for a COG is created by defining and implementing state machines necessary for each COG. Event-driven processing provides reactive behavior for each COG and is implemented by using state machine components that are either already existing in the repository or that are created at this point in time by the domain engineer. Each COG may include one or may state machines, or none at all.

As previously discussed, each state machine includes a state transition diagram, the methods (or command set) that the state machine provides, and a list of methods that the state machine uses (that are connected to components that implement those methods). Also included are input and reference pins for connecting to sensors that the state machine can monitor to trigger state transitions. Output pins are connected to other components as appropriate.

To design the state transition diagram for each state machine component, the states of the system are first determined and then added to the state machine. The domain engineer determines how the state machine will respond to events by defining these events and the transitions that will occur from one state to another. The events (stimuli) that occur may be discrete events, may be conditional statements using system parameters and constant values, or may even be Boolean expressions involving system parameters. As previously noted, a given state machine may in fact be a hierarchy of state machines in that a given state may itself represent another state machine component. For complicated sequences of transitions or for common sequences of transitions, new state machines may be created.

Once transitions have been defined, actions are determined that are to be taken at each transition. Preexisting state transition components are used to perform these actions, and new state transition components may be created if necessary. These state transition components are assigned to the appropriate transition in the state machine. Next, branching based upon possible return codes is determined and is added to the state machine. Once the necessary state machine components have been fully defined, they are also connected to appropriate data flow components and to COGs as necessary.

Subsystem Test

In step 650 each individual COG, state machine component, or higher level subsystem is tested. This is an optional step although is it preferred to test subsystems before system integration. Testing individual subsystems may be performed in a similar fashion as for testing and running the complete system. In step 652 the previously implemented and tested subsystems are integrated together into the complete system. During this step, the high level COGs from each subsystem are linked together graphically through their interfaces in an appropriate manner. In step 654 the complete system diagram is tested and readied for loading and execution.

Execution Environment

Once the system is built, it is also necessary to define the execution environment in which the system will run upon the real-time computer. Of course, as there is a wide range of real-time computers, the definition of an execution environment for each computer will vary widely. In general, though, the user provides values for parameters of run-time operating system 82 and real-time computer 64. By way of example, the user defines a clock rate, defines tasks, priorities, stack sizes, task options particular to an operating system, parameters for run-time modules such as data monitors, debug settings, buffer sizes, etc.

In a preferred embodiment of the invention, a special execution environment component (termed the "habitat" object above) is provided that allows a user to graphically define the run-time operating system parameters that the system will use. Also provided is a clock component that allows a user to graphically determine a clock rate for the system. In general, this execution environment component allows the user to map the needs of the created system to the real-time computer resources. Of course, mapping of these resources may be performed in many different ways and will depend upon the actual real-time computer that is being used. Resources may be mapped manually by giving commands, programming a script file, setting parameters, etc.

Linking

Figure 20:
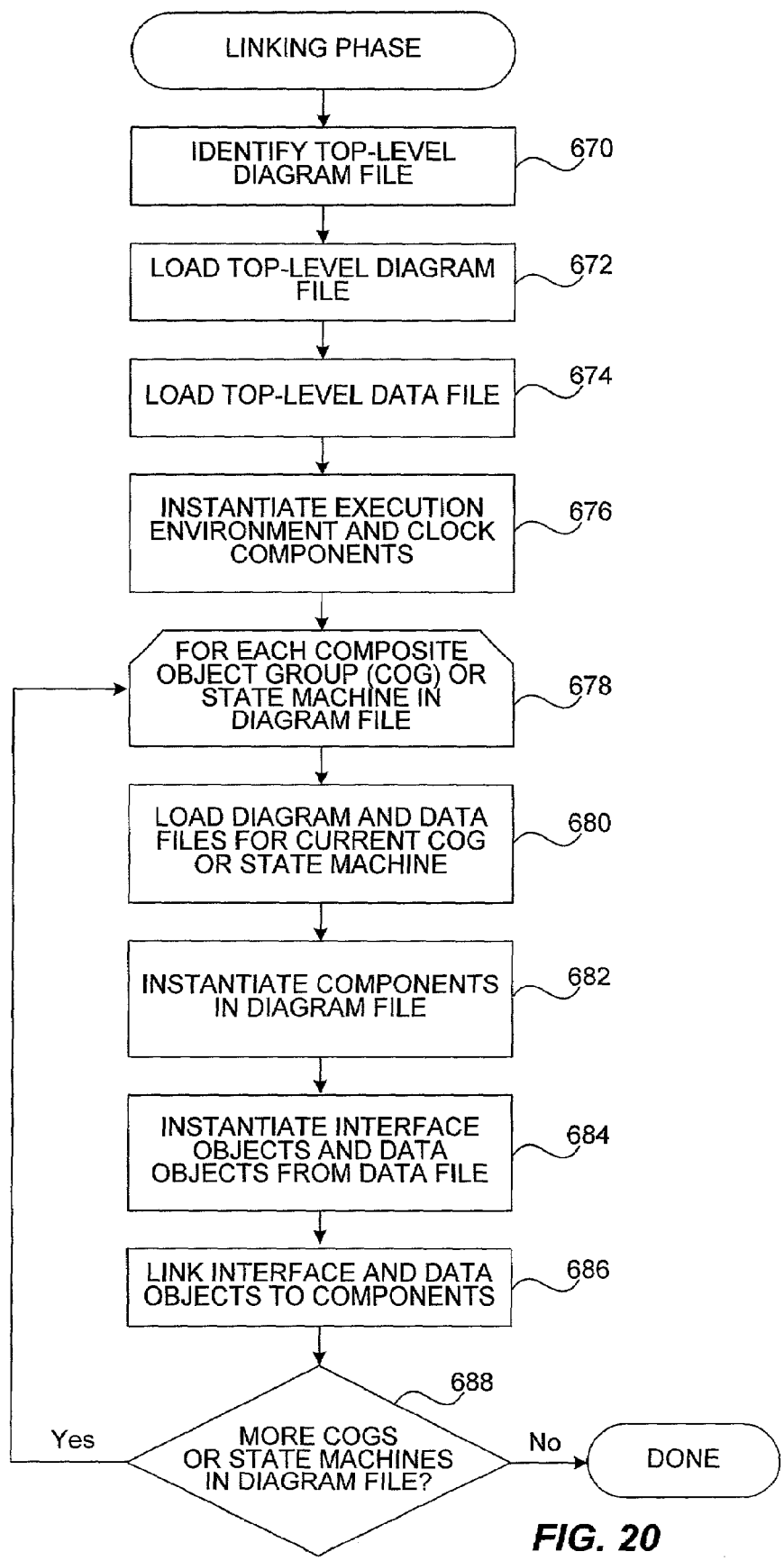
FIG. 20 is a flowchart describing one embodiment for the linking phase step 612 of FIG. 18.

FIG. 20 is a flowchart describing one embodiment for the linking phase step 612 of FIG. 18. In general, the linking phase links together previously compiled and loaded components to one another using diagram files that have been created in step 606. In step 606 the domain engineer has created a hierarchical system diagram 136 that includes a top-level COG (or state machine component) and any number of other lower level COGs, state machines and other components. As shown in FIG. 11B and explained earlier, each of these COGs 146 or state machines components 145 has an associated diagram file.

In step 670 the top-level diagram file is identified. This top-level diagram file represents the COG at the highest level, i.e., the complete system. Alternatively, this diagram file may represent any number of COGs and/or state machines interconnected with other components. In step 672 this top-level diagram file is loaded into real-time computer 64. In step 674 the data file 137a associated with this top-level diagram is also loaded. The data file contains definitions of and initial values for any data objects created at the top level.

As previously noted, the user provides values for operation system parameters to define the execution environment in which the system will run. In a preferred embodiment of the invention, an execution environment component is used to graphically define these parameters and a clock component is used to set a clock rate. In step 676 the execution environment component and the clock component are instantiated. This instantiation spawns operating system threads that will execute the run-time engines. The thread parameters are taken from the execution environment parameters. In an alternative embodiment, a graphical representation of an environment component is not required; threads and parameters may be defined manually.

The flowchart now begins a recursive process in which the top-level diagram file and the diagram files within it are processed recursively. Of course, a programming technique other than recursion may be used to process the hierarchy of COGs. In step 678 the current diagram file (for the first pass this will be the top-level diagram file) is identified and the COGs and/or state machines in this diagram file are identified along with any other components.

For each COG and/or state machine identified, its diagram and data files are loaded in step 680. Each of these pairs of files will then be processed as described below. As previously noted, a diagram file for a COG or state machine includes a list of components included, a list of connections, and how the components are connected together. In step 682 each atomic, data flow or state transition component found in the current diagram file is instantiated. In step 684 each interface object, and each data object (e.g. data matrix) in the data file is also instantiated.

In step 686 the newly-instantiated data and interface objects are linked to the newly instantiated components so that they connect the components as specified in the current diagram file. The graphical connections 528 between components used in system diagram 136 represent instances of data or interface objects. The list of connections is stored in diagram file 137. The linking process provides for each pin and bubble connector for each component a pointer to the data or interface object connected to the pin. Providing pins on different components pointers to the same data object connects the components. For instance, the data read by an encoder sensor may be placed into a data matrix object called "Position" through the encoder sensor's "output" pin. A controller component may have its "x" input pin connected to the same "Position" matrix. The encoder and controller components would then be connected. Each interface component object is in effect a bundle of pins and methods that the connected components can access.

Once the diagram file for the current COG or state machine has been processed, step 688 determines if there are more COGs and/or state machines represented in the current diagram file. If not, this indicates that the lowest level of the system hierarchy has been reached, no more processing is needed and the linking phase ends. If, however, there are more COGs or state machines in the diagram file, the loop begins again at step 678 in order to load the diagram file for the COG or state machine in order to process and to link the components within it.

Initialization

Figure 21:
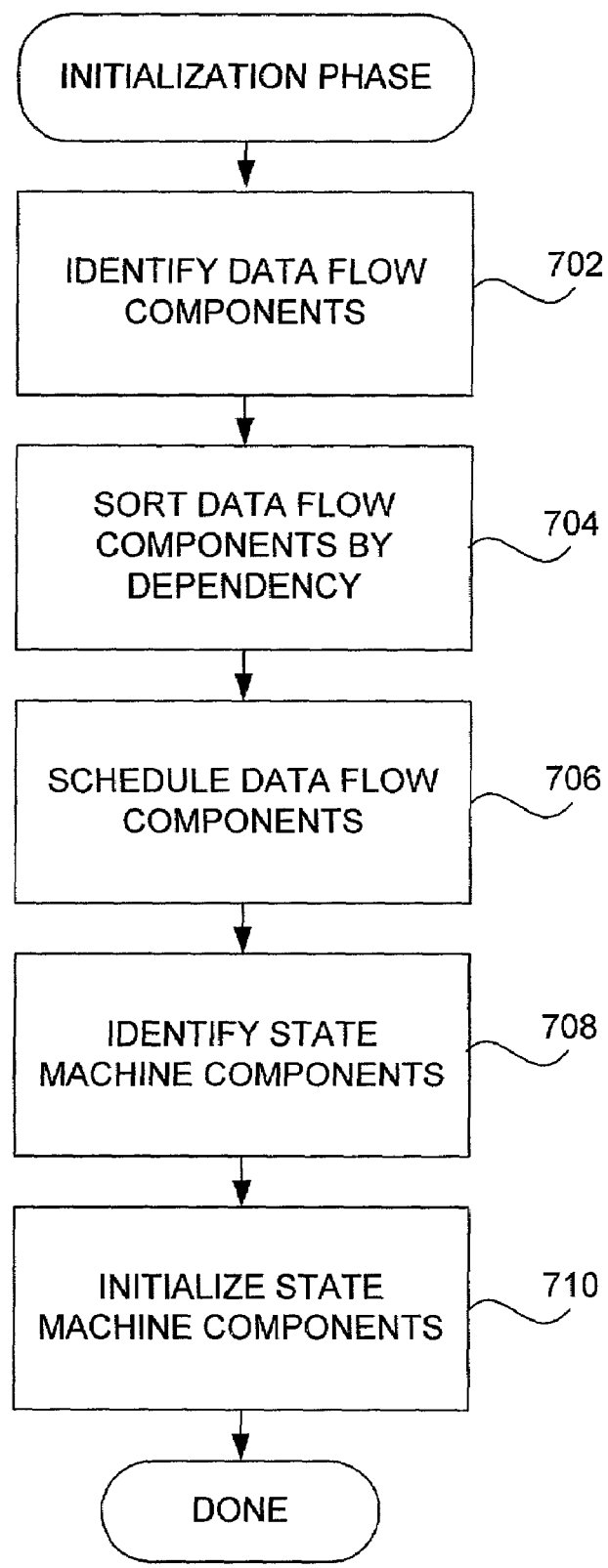
FIG. 21 is a flowchart describing one embodiment for the implementation of initialization phase step 614 of FIG. 18.

FIG. 21 is a flowchart describing one embodiment for the implementation of initialization phase step 614 of FIG. 18. The initialization phase readies the data flow diagram portion of the system and also prepares the state machines of the system for execution.

The run-time engine has built a list of data flow components in the linking stage that are identified in step 702. In step 704 this list of data flow components are sorted by their dependencies. In other words, the interconnections between data flow components are identified and the components are sorted to satisfy input-output relationships. For example, FIG. 14 shows data flow components 204 and 206. In this simple example, component 206 depends upon component 204 because it receives input 230 from that component and can not execute its particular function and until it receives that input value. Thus, component 204 would be placed before component 206 in the sorted list because it must execute first in order to provide a value to component 206.

Once the data flow components have been sorted, in step 706 the initial system mode is activated, causing the default set of data flow components to be scheduled for execution.

The linking phase also builds a list of state machine components. In step 708, the engine traverses the list, and all of the state machine components in the system are initialized. Initialization includes attaching to a habitat, thus setting the machine to receive stimuli from the stimulus queue. The initial state is set, and all persistent stimuli are set to known values.

Finally, the list of all components is traversed, and each is given a chance to perform user-defined initialization, such as resetting state, allocating memory, or other activities.

Data Flow Execution

Figure 22:
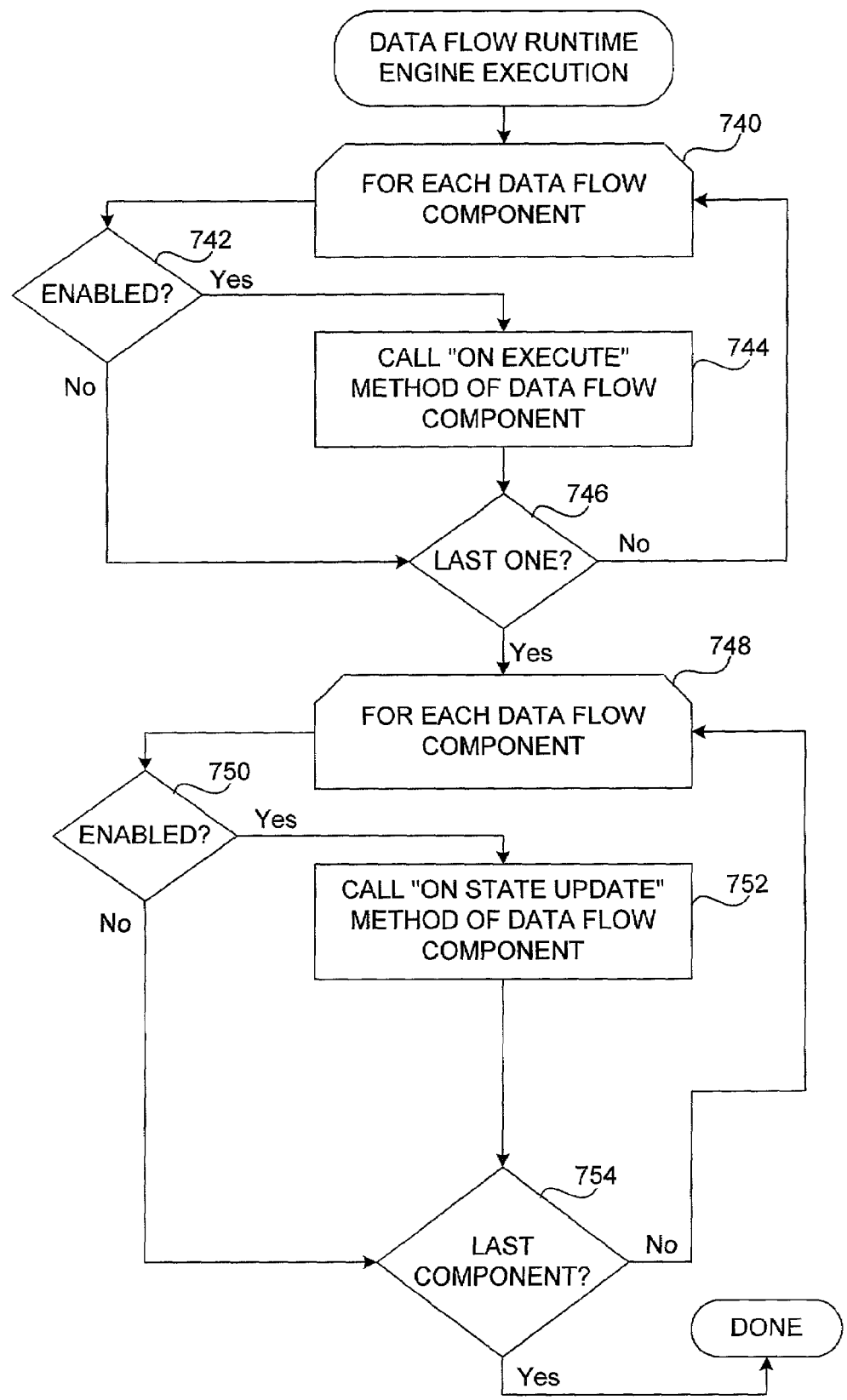
FIG. 22 is a flowchart describing one embodiment for data flow run-time engine execution of FIG. 18.

FIG. 22 is a flowchart describing one embodiment for data flow run-time engine execution of FIG. 18. The data flow run-time engine is responsible for executing each data flow component at the proper time and in proper order so as to produce the correct data flow through the system. As indicated in step 740, each data flow component will be processed in turn based upon the sorted list created in step 706.

Step 742 checks whether the component is enabled in the current mode of the system. If not, control moves to step 746 as execution only proceeds if the component is enabled in the current mode. If so, the OnExecute method of the data flow component is called and executed in step 744. The result of this execution for a particular data flow component is that its input pin values and reference pins are read and its output pins values are then calculated according to the user-defined OnExecute method. Step 746 checks whether the last component has been reached and transfers control to step 748 when done.

A similar process in steps 748-754 lets each component perform any after-the-sample update activities. The two-step structure allows minimal delay during the first part of the execution and is known in the art. Step 752 calls an "OnStateUpdate" method to allow the component to execute any non-time critical code—calculations that do not depend directly on sensor values just acquired or that do not generate output that must be written to actuators, for example. Specific optimizations may be performed to skip components that do not implement On State Update or On Execute methods.

Of course, this execution loop is repeated for every data flow habitat in the system. Each habitat may run at a different rate and on a different priority in a thread. On a multiprocessor system, each habitat may run in a different processor. Each habitat calls the components mapped to it as described in FIGS. 26 and 27.

The data flow run-time engine performs many other functions, such as calling component methods when the system starts and stops sampling, checking for errors, and switching modes of execution.

State Machine Execution

Figure 23:
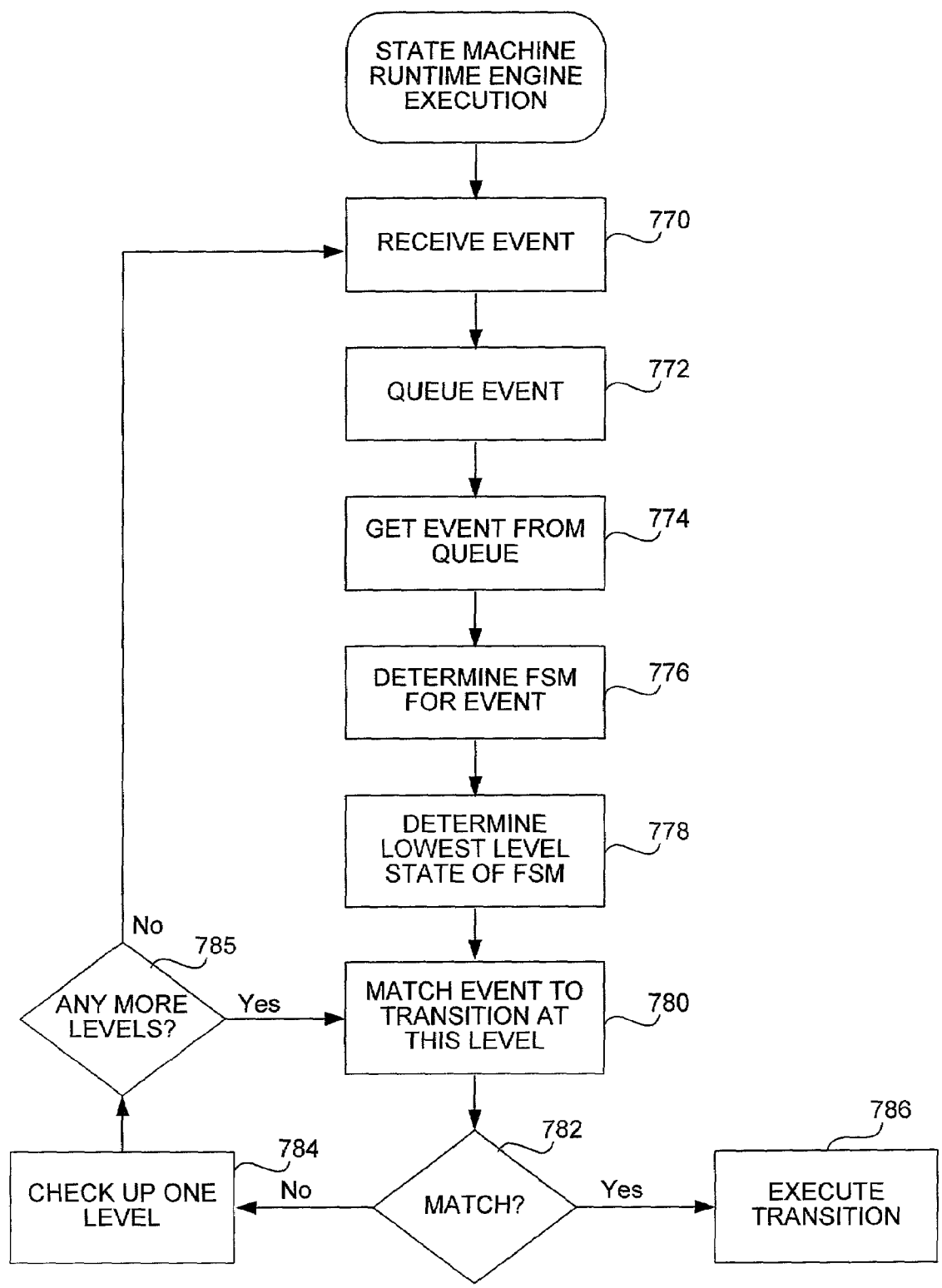
FIG. 23 is a flowchart describing one embodiment of the state machine run-time engine of FIG. 18.

FIG. 23 is a flowchart describing one embodiment of the state machine run-time engine of FIG. 18. The state machine run-time engine is responsible for the operation of each of the state machines within the control system.

In step 770 an event is received by the system. As will be appreciated by those skilled in the art, an event can be any input from a sensor or user that effects operation of the control system. By way of example, typical classes of events include commands, alarms, time-out conditions, sensor value changes, failures and more. The event is queued to the FSM habitat event queue in step 772. When it is queued, the intended state machine is saved with it. Steps 770 and 772 may be handled by different threads of execution than handle the following steps.

The FSM habitat thread is waiting for events in its queue. In step 774 the event is taken from the queue. In 776, the engine determines which state machine should process the event. The engine determines the lowest-hierarchical-level (innermost) state of the FSM in step 778. In step 780, the engine matches the received event with a transition in the current level of the state machine. For example, FIG. 14 shows events "Pick up", "Found", "Not Found", and "Done", each associated with a different transition in state machine 202.

FIG. 7 also shows an event 470 associated with transition 468 in a generic state machine component. If the event matches the transition in step 782, then in step 786 the state transition component that is associated with the matched transition is executed. In general, this step is equivalent to any suitable action or function occurring upon the receipt of its matching event. In a preferred embodiment of the invention, step 786 is performed by executing the OnExecute method of the state transition component associated with the matched transition. For example, FIG. 7 shows a state transition component 474 associated with transition 468. Execution of this method may cause a transition to a new state within a state machine or may cause other actions to occur. If the event does not match, then step 784 checks the enclosing hierarchical level and step 785 checks if there are any more levels. This continues until there is a match or error.

There may be many state machine engines in the system, each processing events from the same or different state machine habitats. State machines are mapped to habitats as described with reference to FIGS. 26 and 27.

Computer System Embodiment

Figure 30:
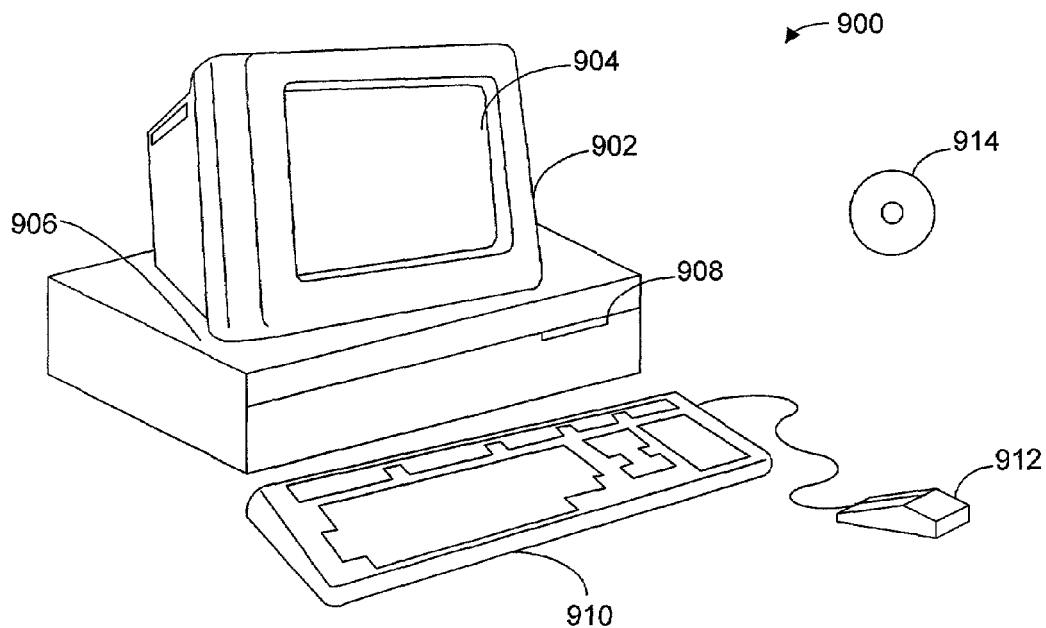
FIGS. 30 and 31 illustrate a computer system 900 suitable for implementing embodiments of the present invention.
Figure 31:
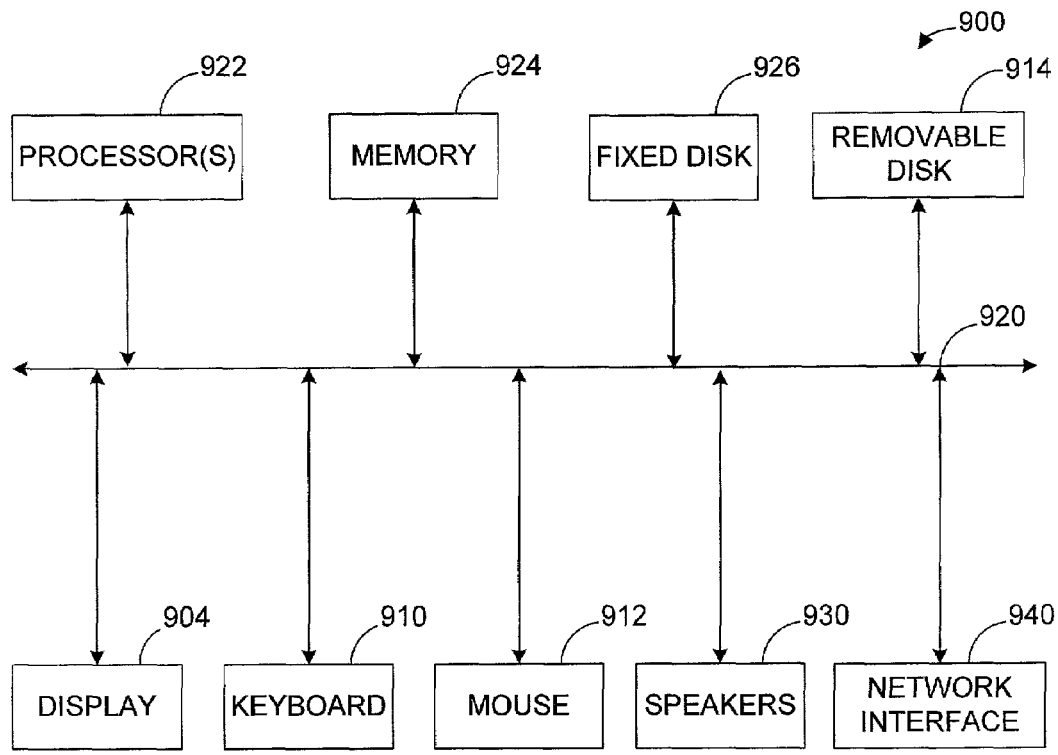

FIGS. 30 and 31 illustrate a computer system 900 suitable for implementing embodiments of the present invention. FIG. 30 shows one possible physical form of the computer system. Of course, the computer system may have many physical forms ranging from an integrated circuit, a printed circuit board and a small handheld device up to a huge super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 31 is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Although the foregoing invention has been described in some detail for purposes of clarity of understanding, it will be apparent that certain changes and modifications may be practiced within the scope of the appended claims. For instance, the invention is applicable to a wide variety of control systems. Also, many types of graphical and/or textual user interfaces work well with the present invention. Therefore, the described embodiments should be taken as illustrative and not restrictive, and the invention should not be limited to the details given herein but should be defined by the following claims and their full scope of equivalents.

We claim:

1. A reusable interface component data structure executed on a computer and stored on a computer readable medium for use in a control system having a plurality of components, said reusable interface component data structure comprising:
    an interface component name, said name indicating an association with one of said components of said control system;
    a group of first method names indicating methods defined upon said component that said component provides;
    a group of second method names indicating methods defined within said control system that said component uses;
    a group of output pin names indicating attributes defined upon said component for which said component provides values;
    a group of input pin names indicating attributes defined within said control system whose values said component uses; whereby said interface component is designed as an interface to said component of said control system and reuse with other of said components wherein each input pin provides a value needed by said component in order for the component to execute.

2. A reusable interface component data structure as recited in claim 1 wherein said control system is an electromechanical control system.

3. A reusable interface component data structure as recited in claim 1 wherein said control system is a real-time control system.

4. A reusable interface component data structure as recited in claim 1 further comprising:
    a graphical representation, whereby said interface component appears as an icon to a user on a computer screen.

5. A reusable interface component data structure as recited in claim 1 wherein said interface component is a computer object and is implemented using object-oriented technology.

6. A reusable interface component data structure, as recited in claim 1, wherein the interface component data structure provides an interface to another component.

7. A reusable interface component data structure, as recited in claim 1, wherein a computer uses the interface component data structure to provide an interface to another component.

8. A reusable interface component data structure, as recited in claim 7, wherein a computer uses the interface component data structure for scheduling execution of components.

* * * * *